(12) United States Patent
Kroll et al.

(10) Patent No.: US 11,048,209 B2
(45) Date of Patent: Jun. 29, 2021

(54) DISPLAY DEVICE

(71) Applicant: SEEREAL TECHNOLOGIES S.A., Munsbach (LU)

(72) Inventors: Bo Kroll, London (GB); Norbert Leister, Dresden Sachsen (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 158 days.

(21) Appl. No.: 16/317,328

(22) PCT Filed: Jul. 12, 2017

(86) PCT No.: PCT/EP2017/067583
§ 371 (c)(1),
(2) Date: Jan. 11, 2019

(87) PCT Pub. No.: WO2018/011285
PCT Pub. Date: Jan. 18, 2018

(65) Prior Publication Data
US 2019/0227492 A1    Jul. 25, 2019

(30) Foreign Application Priority Data
Jul. 13, 2016 (EP) .................................... 16179242

(51) Int. Cl.
*G03H 1/26* (2006.01)
*G09G 3/00* (2006.01)
(Continued)

(52) U.S. Cl.
CPC ........... *G03H 1/268* (2013.01); *G02B 5/1833* (2013.01); *G02B 5/1842* (2013.01);
(Continued)

(58) Field of Classification Search
CPC .. G03H 1/268; G03H 1/02; G03H 2001/0224; G03H 2001/0421;
(Continued)

(56) References Cited

U.S. PATENT DOCUMENTS 6,061,103 A     5/2000 Okamura et al.
6,184,969 B1 *  2/2001 Fergason ............. G02B 5/3083
                                                    349/196
(Continued)

FOREIGN PATENT DOCUMENTS

WO    2010/149588 A1    12/2010
WO    2012/062681 A1     5/2012

OTHER PUBLICATIONS

International Search Report, dated Nov. 7, 2017, and Written Opinion, issued in International Application No. PCT/EP2017/067583).

*Primary Examiner* — Marin Pichler
*Assistant Examiner* — Henry A Duong
(74) *Attorney, Agent, or Firm* — Saul Ewing Arnstein & Lehr LLP

(57) ABSTRACT

The invention relates to a display device, in particular a head-mounted display or a head-up display, for representing a two-dimensional and/or three-dimensional scene. The display device comprises a spatial light modulator device having pixels, and a beam offset device. The spatial light modulator device is illuminatable with light. The beam offset device is configured to be controllable in such a way that the light modulated by the pixels of the spatial light modulator device is laterally displaceable by less than one pixel extent.

27 Claims, 11 Drawing Sheets

(51) Int. Cl.
*G02B 27/01* (2006.01)
*G02B 5/18* (2006.01)
*G02B 5/30* (2006.01)
*G02B 27/00* (2006.01)
*G03H 1/02* (2006.01)
*G09G 3/02* (2006.01)
*G02B 26/06* (2006.01)

(52) U.S. Cl.
CPC ....... *G02B 5/3083* (2013.01); *G02B 27/0068* (2013.01); *G02B 27/0101* (2013.01); *G02B 27/0172* (2013.01); *G03H 1/02* (2013.01); *G09G 3/003* (2013.01); *G09G 3/02* (2013.01); *G02B 26/06* (2013.01); *G02B 2027/0147* (2013.01); *G03H 2001/0224* (2013.01); *G09G 2340/0407* (2013.01)

(58) Field of Classification Search
CPC ... G03H 2001/0423; G03H 2001/0426; G02B 27/0172; G02B 27/0101; G02B 5/1833; G02B 5/1842; G02B 5/3083; G02B 27/0068; G02B 2027/0147; G02B 26/06; G09G 3/02; G09G 3/003; G09G 2340/0407
USPC .......................................................... 359/23
See application file for complete search history.

(56) References Cited

U.S. PATENT DOCUMENTS

| | | | |
|---|---|---|---|
| 8,736,967 B1* | 5/2014 | Browne | G02B 27/0172 359/668 |
| 2004/0085486 A1 | 5/2004 | Katoh et al. | |
| 2005/0105016 A1 | 5/2005 | Kurihara et al. | |
| 2012/0092735 A1* | 4/2012 | Futterer | G03H 1/08 359/11 |
| 2013/0222384 A1 | 8/2013 | Futterer | |

* cited by examiner

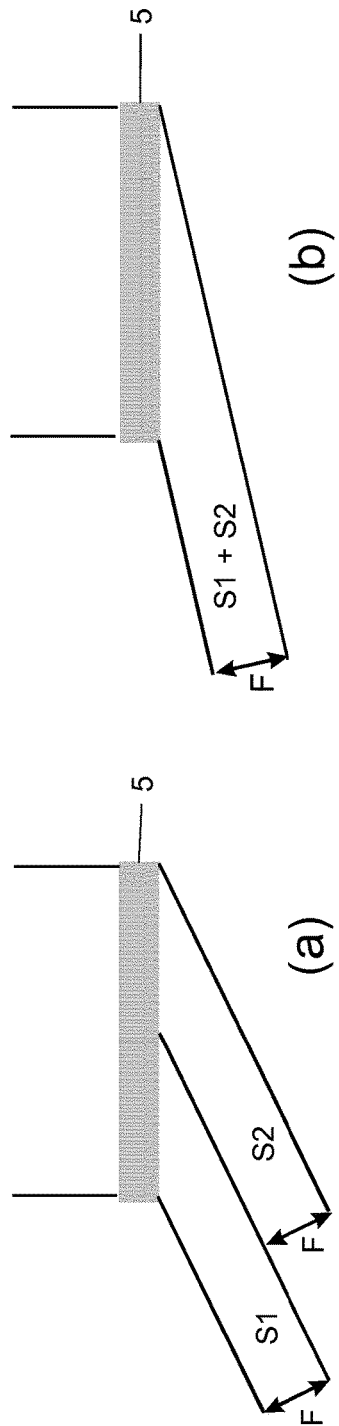
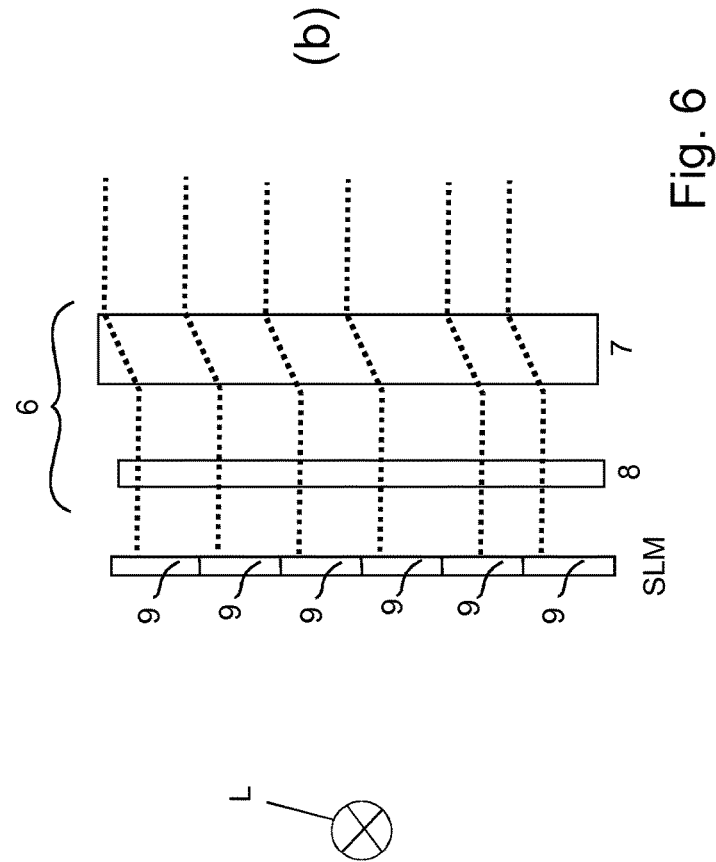
Fig. 5
Fig. 6

DISPLAY DEVICE

CROSS REFERENCE TO RELATED APPLICATIONS

This application claims the priority of PCT/EP2017/067583, filed on Jul. 12, 2017, which claims priority to European Application No. EP 16179242.9, filed on Jul. 13, 2016, the entire contents of each of which are incorporated fully herein by reference.

BACKGROUND OF THE INVENTION

The invention relates to an in particular three-dimensional display device, or a three-dimensional display, which may for example be designed as a stereoscopic display device, a light-field display device or a holographic display device. In particular, the invention relates to a holographic display device, in particular to a head-mounted display or a head-up display, representing a two- and/or three-dimensional scene. The invention furthermore relates in a particular embodiment to a holographic display device with single-parallax encoding.

The human eye typically has a resolution of one minute of arc. Per degree of viewing angle or field of view, the human eye can therefore usually resolve 60 points.

If a display device, also referred to as a display, has a poor resolution than the resolution which the human eye can perceive, this is generally perceived as perturbing by an observer of the display device. For example, in a display device the lines or intermediate spaces separating individual pixels or modulation elements may be perceived as perturbing black edges or black regions. This is also known as the screen-door effect.

Display devices for different applications usually differ inter alia by the viewing angle. For example, computer monitors or television sets often have small to medium viewing angles. A computer monitor with a 20-inch diagonal at a distance of 70 cm from an observer would, for example, have an viewing angle of about 17.5 times 10 degrees. There would also be an viewing angle of equal size for a 55-inch television set at a distance of about 2 meters from the observer. For such display devices, previously available pixel numbers and pixel sizes are usually sufficient in order, for a standard two-dimensional display device, to display more pixels per degree than the human eye can resolve. Assuming 60 pixels per degree, for example, at least 1050 pixels times 600 pixels would be required for the 17.5 times 10 degree viewing angle. However, computer monitors and television sets often have at least HDTV (high-definition television), i.e. 1920×1080 pixels, that is to say more pixels than the eye can resolve.

However, display devices arranged or provided close to an observer's eye, for example head-mounted displays (HMDs), often require large viewing angles. In addition, mobile display devices, or appliances, of this type require a lightweight and compact structure, so that however the size and pixel number of a spatial light modulator device (SLM) provided in the device and the imaging optics used could be limited.

Some types of spatial light modulator devices furthermore have restrictions in terms of the realistically usable pixel sizes. Spatial light modulator devices based on liquid crystals, for example, have greater crosstalk between neighboring pixels with a decreasing pixel pitch. The pixels cannot therefore be miniaturized to any desired extent. The number of pixels usable on a realistic size of the spatial light modulator device for a compact mobile display device is therefore limited. The present invention is not, however, intended to be limited to a particular type of spatial light modulator device.

In order, for example, to achieve an viewing angle of 90 degrees with a resolution of 60 pixels per degree, a spatial light modulator device would need to have about 5400 pixels in one direction or dimension.

Furthermore, particular types of display devices are known which require a higher pixel number, which is higher than the representable number of object points. In multi-view stereo displays, for example, the number of representable object points is given by the pixel resolution of the spatial light modulator device divided by the number of representable views. For holographic display devices, or displays, which operate with a virtual visibility region or a virtual viewing window, the resolution of a three-dimensional (3D) scene in the hologram calculation is in principle freely selectable. On the other hand, however, the size of this virtual visibility region or the virtual viewing window is dependent on the number of pixels per degree of viewing angle.

In order to be able to see a three-dimensional scene with the full resolution possible for a human eye, the virtual visibility region or the virtual viewing window should at least have the size of the pupil of the observer's eye. A virtual visibility region or viewing window smaller in its size than the pupil of the observer's eye would typically lead to a resolution of the three-dimensional scene perceived in an inferior way compared with natural vision, even if the hologram to be encoded into the spatial light modulator device would be calculated with a high resolution of object points.

Advantageously, the size or extent of the virtual visibility region or viewing window will be selected to be slightly greater than the pupil size of an observer's eye, in order to compensate for tolerances in the detection or registering of the eye position of the observer. One example might be a 7 mm large virtual visibility region or viewing window in comparison with a typical pupil size of a human eye, depending on the light conditions, of about 3 mm-5 mm. In order to be able to represent a three-dimensional scene with a high resolution in a holographic display device so that it can be seen from a virtual visibility region or viewing window of a particular size, a certain number of pixels or modulation elements per degree of viewing angle or field of view is therefore also necessary.

In order, for example, to generate a virtual visibility region or viewing window with a size of about 7 mm for light of a blue wavelength, about 250 pixels per degree of viewing angle are required. Even with a spatial light modulator device which has a relatively large number of 2000 pixels in one dimension or direction, a viewing angle of only about 8 degrees would be obtained.

For the generation of a three-dimensional scene by means of holography, the writing of a complex-valued hologram into the spatial light modulator device is generally required. In this case, a plurality of pixels of the spatial light modulator device may either be merged by means of encoding to form a macropixel, or combined by a beam combiner unit to form a macropixel. Then, for example, 250 macropixels or combined pixels are required per degree of viewing angle in order to generate a virtual visibility region or viewing window of about 7 mm, i.e. an even greater number of individual pixels of the spatial light modulator device. Particularly in a holographic head-mounted display (HMD), a very large field of view (FoV) is often desired. A large field of view demands a considerable number of required pixels of the spatial light modulator device. This large number exceeds the number of pixels in the case of previously available microdisplays.

In order to be able to solve this problem, the Applicant has developed according to WO 2012/062681 A1 a display device, in particular an HMD, in which tiling is carried out by generating a large field of view, or a large viewing region, in temporal succession with the aid of a plurality of tiles, or segments. This tiling is also referred to as segmented multiple imaging of the spatial light modulator. A sufficiently rapid spatial light modulator with a small number of pixels may then be used.

FIG. 1 shows according to WO 2012/062681 A1 in principle a setup of a display device, in particular a head-mounted display (HMD), which comprises a light deflection device 100 having light deflection means 110 and 120. A spatial light modulator device SLM to be multiply imaged is followed in the light direction by the light deflection device 100 and an imaging element 200, which is designed as a magnifying lens. By means of the SLM, subholograms of a three-dimensional scene with different views are generated by modulations of wavefronts in temporal succession. The pixels of the SLM are illuminated with light, and a wavefront 300 modulated in temporal succession by the SLM is deflected in the light deflection device 100 in different directions as modulated wavefronts 320, 330, 340. With the light deflection device 100, the SLM can be represented in a segmented fashion in temporal sequence in the plane of the imaging element 200 as a composite virtual SLM with high resolution. With the segments of the SLM which can be represented multiply next to one another in one or two directions, SLM images assignable to the segments are virtually visible in a spatial visibility region or viewing region, inside which the three-dimensionally reconstructed scene can be perceived, the SLM images being assignable modulated wavefronts 320-340 at the corresponding times of the different light deflections by the light deflection device 100. In this way, an observer can detect the spanned visibility region in its entirety and observe the three-dimensional reconstructed scene. By means of the modulated wavefront 300 guided by the light deflection device 100, the SLM can be multiply represented temporally and/or statically next to one another in the plane of the imaging element 200.

This composition of the SLM images is also referred to as tiling. Because of the tiles or modulated wavefronts 320, 330 and 340 lying next to one another, however, significantly magnified optics 200 are necessary between these tiles and an observer, here represented by an observer's eye 400.

A similar type of tiling would in principle also be possible in a stereoscopic or monoscopic (two-dimensional) head-mounted display, but would have essentially the same restrictions.

In FIG. 2 different tiles, or wavefronts, are generated according to WO 2012/062681 A1 with the aid of an arrangement of two gratings 160 and 170 for a holographic head-mounted display. The light deflection device 100 in this case has the light deflection means 160 and 170 designed as gratings. The magnification optics 200 are in this case arranged between the SLM and the light deflection device 100. Different deflection functions must be written into the light deflection means 160 and 170 in order to generate the tiles, or modulated wavefronts. This setup of the display device according to FIG. 2 may use smaller lenses, or optical elements, than the setup of a display device as shown in FIG. 1. Because of different light paths, however, the tiles generated according to FIGS. 1 and 2 respectively also have different optical aberrations, which need to be corrected for good representation of the reconstructed scene. Because of the different aberrations, however, it is more complex to carry out a correction of these different aberrations for all the tiles.

The total number of required pixels of the spatial light modulator device for a holographic head-mounted display could be reduced further by using single-parallax encoding of a hologram instead of full-parallax encoding. If, for example, about 250 pixels/degree of viewing angle are used for full-parallax encoding both in the vertical direction and in the horizontal direction, this pixel number of 250 pixels would be required for single-parallax encoding in only one encoding direction. In the direction perpendicular thereto, the pixels per degree of viewing angle may be adapted to the eye resolution, that is to say 60 pixels per degree of viewing angle corresponding to a resolution of the human eye of one minute of arc (1/60 degree).

Single-parallax encoding would nevertheless generally require tiling of the imaged spatial light modulator device both in the horizontal and in the vertical direction in order to achieve a very large field of view.

One fundamental aim in a near-to-eye display, particularly in a head-mounted display, is to achieve a compact optical setup since as ergonomic factors, in particular for a head-mounted display fastened on the head, its volume and weight are of particular importance in comparison with direct-view displays. Another aim is furthermore to achieve a high light efficiency since this has an influence on the energy consumption, and for a mobile device the energy consumption influences the battery lifetime.

Some configurations which are disclosed in WO 2012/062681 A1 describe, for example, the generation of a real intermediate image of the spatial light modulator, this image being composed of a plurality of tiles. In this case, however, relatively large optics are required for the light path from the composite intermediate image of the spatial light modulator to a virtual viewing window in an observer plane. This could possibly have an unfavorable effect on the compactness of the optical setup.

Other configurations in WO 2012/062681 A1 describe for example, the generation of tiles by means of a plurality of deflection gratings.

In a head-mounted display, aberrations may also in principle occur because of the optical elements, the effect of these aberrations being that the virtual image of the spatial light modulator is not imaged error-free.

In the case of tiling according to the possible arrangements as are described in WO 2012/062681 A1, the light path through the optical system would be mutually different for different tiles. Because of this different light path, the aberrations occurring for different tiles would generally also differ from one another. In this case, a correction of the aberrations ought to be carried out individually for each tile, or under certain circumstances only an average correction may be carried out, which however generally achieves a common correction for all the tiles which is reduced in quality.

SUMMARY OF THE INVENTION

It is therefore an object of the present invention to provide a display device for representing a two-dimensional and/or three-dimensional scene, which allows the representation of an increased number of image points with a simple and compact setup of the display device. It is furthermore an object of the present invention to provide a head-mounted display device or a near-to-eye display device, with which the disadvantages of the prior art, in particular the disadvantages of conventional tiling, are avoided.

The present object is achieved according to the invention by a display device having the features of claim 1.

The display device according to the invention, which may for example be designed as a head-mounted display or as a head-up display, although of course other display types such as direct-view displays are also possible, is used for representing a two-dimensional and/or three-dimensional scene. The display device comprises a spatial light modulator device and a beam offset device. The spatial light modulator device comprises modulation elements, also referred to as pixels, by means of which the incident light emitted by an illumination device can be modulated in amplitude and/or phase. The spatial light modulator device can therefore be illuminated with light. The beam offset device is in this case configured and controllable in such a way that the light modulated by the pixels of the spatial light modulator device is laterally displaceable, or moveable, by less than one pixel extent.

The display device according to the invention therefore has a beam offset device, which is configured switchably or controllably. This beam offset device is therefore provided in order to laterally displace light from an illumination device, which may comprise at least one light source and illuminates the spatial light modulator device, by fractions of a pixel or by less than one pixel extent of the spatial light modulator device. By adjusting different switching states of the beam offset device, it is possible according to the invention for the light to leave the spatial light modulator device either unoffset or undisplaced, i.e. without a change in its light direction, or offset or displaced, i.e. with a change in its light direction. The switching states of the beam offset device are in this case implemented in temporal succession. This means that light incident on the beam offset device in one switching state of the beam offset device leaves the latter unchanged in its light direction. In another switching state of the beam offset device, the light leaves the beam offset device with a sideways or lateral offset with respect to the entry light. In other words, an incident light beam is offset or displaced by means of the beam offset device laterally, that is to say horizontally and/or vertically and/or also obliquely, preferably by less than one pixel extent in the respective direction. The light beam therefore leaves the beam offset device with a lateral offset, which is only minimal, or very small. The offset should advantageously be less than one pixel extent, in order to ensure that the light paths in the display device are equally, or essentially equally, long for all the light rays, in order to prevent possibly occurring aberrations, or to avoid different aberrations caused by differing light paths. In particular cases, however, it may be entirely expedient for the size of the offset to correspond to one pixel extent, or even be slightly greater than one pixel extent. According to the invention, therefore, by a combination of the switching states of the beam offset device which are implemented in temporal succession, an increased spatial resolution is obtained in comparison with the pixel pitch of the spatial light modulator device. In this way, with a simply and compactly constructed display device, it is possible to represent an increased number of image points, for example in order to generate a large field of view.

Further advantageous configurations and refinements of the invention may be found in the dependent claims.

In one preferred embodiment of the invention, provision may be made that the beam offset device comprises at least one birefringent optical element or at least one volume grating and/or at least one polarization grating. The beam offset device may therefore also comprise a combination of at least one volume grating and at least one polarization grating.

Advantageously, it can be provided that the beam offset device comprises at least one birefringent optical element and a switch device. The birefringent optical element is coupled to the switch device and controllable in such a way that the incident light can be laterally displaceable. The mutual lateral displacement of the light by fractions of a pixel or by less than the pixel extent may, for example, be carried out by providing a birefringent optical element of defined thickness having an optical axis oblique to the light propagation direction, in combination with a switch device. The birefringent optical element may, for example, be designed as a Savart plate. This birefringent optical element is also rather a passive birefringent optical element. The switch device is in this case arranged before the birefringent optical element in the light direction, and may comprise at least one polarization switch. This switch device, or the polarization switch, is provided in order to convert the polarization of the light from one state into another state. Light of one polarization would therefore pass through the birefringent optical element without an offset. Light of a polarization perpendicular thereto would, however, pass through the birefringent optical element with a lateral offset. This means that the light emerging from the birefringent optical element experiences a lateral offset in comparison with the entry light.

Advantageously, the lateral offset of the light may be determined by the thickness d of the at least one birefringent optical element, and by the birefringence $\Delta n$ and by the orientation of the optical axis of the birefringent optical element relative to the incoming light. In a passive birefringent optical element, these values are fixedly determined. In one particular embodiment, a controllable birefringent optical element could also be provided, for example a liquid-crystal layer, in which the lateral offset of the light with respect to the entry light can be adjusted by changing the orientation of the optical axis.

The lateral offset may be adapted to the desired or required value by means of the selection of the thickness of the birefringent optical element. The invention is not, however, restricted to this way of generating the offset of fractions of a pixel.

It could therefore also be advantageous for the beam offset device to comprise at least two volume gratings and/or at least two polarization gratings. The at least two volume gratings and/or the at least two polarization gratings are in this case configured to be switchable.

As an alternative thereto, however, the beam offset device may also comprise at least two volume gratings, which are spaced apart from one another, and a switch device. The at least two volume gratings are in coupled to the switch device and controllable in such a way that the incident light is laterally displaceable. The switch device may also be designed as a polarization switch. For example, an arrangement of at least two volume gratings, which are spaced apart from one another by means of a spacer, may be used inside the beam offset device. The at least two volume gratings either are configured to be self-switchable or may be passive and polarization-selective. If the at least two volume gratings are configured to be passive, they may be combined with a switch device, which for example comprises at least two polarization switches. A first volume grating would then deflect the incident light according to its properties. A second volume grating, downstream of the first volume grating, would then in turn deflect the light according to its properties so that the light emerges from the beam offset device parallel to its entry angle. An offset of fractions of a pixel may be determined by the selection of the deflection angle in the respective volume grating and the distance between the at least two volume gratings.

In another alternative embodiment of the beam offset device, instead of volume gratings, this beam offset device may comprise at least two polarization gratings, which are spaced apart from one another, and a switch device. The at least two polarization gratings are likewise coupled to the switch device and controllable in such a way that the incident light is laterally displaceable. The switch device may also be designed as a polarization switch. For example, an arrangement of at least two polarization gratings, which are spaced apart from one another by means of a spacer, may also be used inside the beam offset device. The at least two polarization gratings may be configured to be self-switchable or passive. If the at least two polarization gratings are configured to be passive, they may be combined with a switch device, which for example comprises at least one polarization switch. In one switching state of the switch device, an offset of V=+1/N could thus be generated, where N is a number not equal to 1, while in another switching state of the switch device an offset of V=−1/N could be generated. A desired or required offset may be determined by means of the spacer between the at least two polarization gratings.

At least two volume gratings could, however, also be combined together with at least two polarization gratings in the beam offset device, in order to generate a lateral offset of the incident light, in which case the volume gratings as well as the polarization gratings may be passive gratings or switchable gratings.

In one embodiment according to the invention, it may furthermore be provided that the beam offset device is provided for generating an offset of the light in at least one lateral direction. The beam offset device may optionally be provided for increasing the resolution in the horizontal direction or in the vertical direction. It is, however, also possible to provide or carry out a displacement or offset of the light in the horizontal and vertical directions. For example, two birefringent optical elements, for example two Savart plates, may to this end be combined with a switch device which comprises two polarization switches. A first polarization switch of the switch device and a first birefringent optical element then generate an offset of the light of less than one pixel extent, for example an offset of one half of a pixel, in the horizontal direction. A second polarization switch of the switch device and a second birefringent optical element, rotated by 90 degrees relative to the first birefringent optical element, independently thereof generate an offset of the light of less than one pixel extent, for example an offset of one half of a pixel, in the vertical direction.

In one preferred embodiment of the invention, a light displacement or a light offset is intended to be provided in only one direction, for example only in the horizontal direction, and/or a different number of pixels per degree of viewing angle is required in the two directions, horizontal and vertical. This is the case, for example, in the case of a holographic head-mounted display with single-parallax encoding.

In another advantageous embodiment of the invention, it may be provided that an optical system for generating segments of the spatial light modulator device in a viewing region is provided. The beam offset device may in this case be controlled in such a way that the individual segments are displaced with respect to one another by less than one pixel extent. In a holographic display device according to the invention, a hologram should preferably be encoded into the spatial light modulator device by means of single-parallax encoding. Besides a single-parallax calculation of the holograms, there is also the possibility of full-parallax calculation. In single-parallax encoding, for example, the hologram of an object point is calculated and encoded not in the form of a two-dimensional spherical lens, as in the case of full-parallax encoding, but in the form of a cylindrical lens. In such a display device, by means of the optical system, a plurality of segments of the spatial light modulator device are generated or the spatial light modulator device is multiply imaged as a segment, so that a kind of tiling is carried out in the incoherent direction in such a way that the individual segments of the spatial light modulator device are laterally displaced or offset with respect to one another only by fractions of a pixel or by less than one pixel extent.

The number of pixels per degree of viewing angle may, however, be selected in such a way that this number of pixels in each segment generated is less than the value actually needed or required.

This could be illustrated by the following example: Instead of 60 pixels per degree of viewing angle, for example, two segments of the spatial light modulator device may be generated which each have half the number of pixels per degree of viewing angle, i.e. 30 pixels per degree of viewing angle. In a head-mounted display, a virtually magnified image of the spatial light modulator device is generally used, so that the number of pixels per degree of viewing angle in the generated segment of the spatial light modulator device can generally be adjusted by means of the magnification factor. If the two generated segments of the spatial light modulator device are for example displaced by one half (½) pixel extent with respect to one another, an observer of a generated object point can then see effectively 60 pixels per degree of viewing angle by superposition of the two segments generated.

According to this feature according to the invention, it is of course also possible to generate a plurality of segments of the spatial light modulator device in this way, in order to achieve a high spatial resolution in at least one direction. For example, three segments of the spatial light modulator device may therefore be generated, each with ⅓ of the pixels per degree of viewing angle, for example 20 pixels per degree of viewing angle, and a light offset or a light displacement by respectively ⅓ of the pixel extent between the individual segments. The invention is not of course intended to be restricted to these numerical examples.

When generating more than two segments of the spatial light modulator device, the beam offset device may comprise a stack having a plurality of birefringent optical elements or a plurality of volume gratings or a plurality of polarization gratings, and the switch device may if required comprise a plurality of polarization switches.

In general terms, in order to generate N segments of the spatial light modulator device in the viewing region, a displacement of the individual segments with respect to one another by a value of 1/N of the pixel extent is provided, where N≠1.

Since the individual generated segments of the spatial light modulator device are only very slightly displaced or offset with respect to one another, they or the respective light beams for generating these segments have essentially the same light path in the display device according to the invention. Because of this, possibly occurring aberrations are the same for a plurality of segments of the spatial light modulator device. In this way, correction of these aberrations is furthermore simplified.

Advantageously, it may be provided that the generation of segments of the spatial light modulator device with an offset in a lateral direction by means of the light offset device is combined with the generation of segments of the spatial light modulator device in a lateral direction perpendicular thereto by means of a deflection device.

The generation of segments of the spatial light modulator device with a beam offset device in one dimension or direction, for example horizontally, may also be combined with conventional generation of segments according to the prior art in another dimension or direction, for example vertically. This conventional generation of segments may, for example, be carried out with the aid of a deflection device which comprises at least one deflection element, for example a liquid-crystal grating (LCG). Particularly in a holographic display device with single-parallax encoding, in a preferred embodiment the generation of segments with a beam offset device is carried out in the incoherent direction, i.e. perpendicularly to the encoding direction of the holograms. In the encoding direction the generation of segments is additionally carried out with the aid of deflection elements of the deflection device. In one example, for one-dimensional (1D) encoding of a scene or a hologram, for example for the purpose of an example a vertical parallax (vertical parallax-only (VPO)) encoding, two horizontal segments are generated with a beam offset device and three vertical segments are generated with the aid of deflection elements, i.e. in total six segments (2×3). If diffractive deflection elements are used in this case, it should be taken into account that their deflection angle changes with the wavelength. Conventional generation of segments with diffractive deflection elements therefore rather requires time-sequential representation, not only of the individual segments but also of the primary colors red, green and blue. Because of this, high basic frequencies (frame rate) for the deflection elements are required overall.

A beam offset device, particularly in an embodiment with a birefringent optical element or with a stack of passive volume gratings, each of which is configured for one wavelength, may however generate a beam offset which is essentially the same for all wavelengths or has only very small—tolerable—changes with the wavelength, for instance because of dispersion of the refractive index of the birefringent optical element.

In one advantageous embodiment of the invention, in order to generate segments with a beam offset device, the spatial light modulator device may be operated sequentially for the individual primary colors red, green and blue (RGB). In this case, the red component, the green component and the blue component of the two-dimensional or three-dimensional scene or of the hologram for the same segment are successively written into the spatial light modulator device followed by the red component, the green component and the blue component of the two-dimensional or three-dimensional scene or of the hologram for the next segment. The switch device in the beam offset device is, however, only switched between the display of different segments, and remains in the same switching state during a change of the color for the same segment. In this embodiment, the switch device can therefore be operated with a basic frequency (frame rate) which is lower by a factor of 3 than the spatial light modulator device.

In another advantageous embodiment of the invention, particularly in the case of a combination of the generation of segments with a beam offset device in one dimension or direction, and the generation of segments with deflection elements in another dimension or direction, the component of the two-dimensional or three-dimensional scene or of the hologram can be written into the spatial light modulator device first for the same color, but successively for a plurality of segments. Only then is another color switched to. In other words, for a primary color of the light, for a plurality of segments of the spatial light modulator device which are to be generated with the beam offset device, the color component of a scene or a hologram may be written successively into the spatial light modulator device. Although in this case the switch device in the beam offset device must be operated with the same basic frequency (frame rate) as the spatial light modulator device, the deflection device or the deflection elements may however be operated with a lower basic frequency than the spatial light modulator device.

In the already mentioned example with the two horizontal segments and the three vertical segments, for a fixed vertical segment, for the same color the component of the two-dimensional or three-dimensional scene or of the hologram would respectively be written successively into the spatial light modulator device for the first horizontal segment and for the second horizontal segment. The spatial light modulator device and the switch device in the beam offset device would be operated with the same basic frequency. The deflection elements for the vertical segments would, however, respectively remain in the same drive state for the display of two successive horizontal segments, and may therefore be operated with only half the basic frequency compared with the spatial light modulator device. New deflection functions would in turn need to be written into the deflection elements in order to generate different vertical segments, and in the case of different colors for the same vertical segment.

In such a display device, in order to generate horizontal and vertical segments, first a beam offset device, and after this a deflection device which comprises deflection elements, are provided after the SLM in the light direction. Arrangement of the deflection device before the beam offset device in the light direction is rather unfavorable, since depending on the deflection state the light then passes obliquely through the beam offset device. Such an arrangement is, however, possible in principle.

Such configurations are advantageous in particular when, for example, as the spatial light modulator device, a MEMS (microelectromechanical systems) micromirror display device which allows controlling with very high basic frequencies is used, and either the switch device in the beam offset device and/or the deflection elements of the deflection device are based on liquid crystals and are restricted in their basic frequencies. A liquid crystal-based switch device can be accelerated by an increase in the basic voltage, while the other hand for a liquid crystal-based deflection element, for example a liquid-crystal grating, the basic voltages may be restricted. In this case, the basic frequency of the deflection element would be the limiting factor. The described arrangement, which requires high basic frequencies in the spatial light modulator device and in the switch device in the beam offset device, but in comparison therewith somewhat lower basic frequencies in the deflection element, is then advantageously usable. The invention is not however restricted to this embodiment, but also comprises other possible combinations for driving the spatial light modulator device, the switch device in the beam offset device, and if present the deflection elements, with a different basic frequency.

In one advantageous embodiment of the invention, the light displacement or the light offset may be used in combination with anamorphic broadening of the light. The optical system may be provided for magnified imaging of the segments of the spatial light modulator device. The optical system may furthermore provide anamorphic imaging or broadening of the light, or of the segments of the spatial light modulator device.

In general, hitherto available spatial light modulator devices have almost square pixels. Particularly for single-parallax encoding, a greater number of pixels per degree of viewing angle is required in the encoding direction than in the direction perpendicular thereto. By anamorphic imaging or broadening of the light, so that a different imaging factor can be produced in the horizontal and vertical directions, it is possible to achieve the effect that, for example, an image of a square pixel becomes rectangular. By the selection of the anamorphic factor, the number of pixels per degree of viewing angle can therefore be adjusted or determined differently horizontally and vertically. For example, approximately an anamorphic factor of from 2 to 3 is conventionally used in previously known display devices or displays, in order to adjust the desired or required pixels per degree of viewing angle.

Furthermore, it may be provided that a beam combiner unit is provided, with which respectively at least two pixels of the spatial light modulator device are combinable to form a macropixel. In the spatial light modulator device, a plurality of pixels may be combined to form a macropixel either in the encoding but at the hardware level in a beam combiner unit. This position is also to be taken into account when using an anamorphic factor. Single-parallax encoding requires, for example, in the example already mentioned above in the introductory part of the invention, 250 pixels per degree of viewing angle in the encoding direction and 60 pixels per degree of viewing angle in the direction perpendicular thereto. If two phase pixels are combined in the direction perpendicular to the encoding direction to form a complex-valued macropixel, this therefore corresponds to 60 macropixels, but 120 phase pixels. For the square phase pixels, this therefore gives an anamorphic factor of 250/120, i.e. about 2.1 to 1.

One preferred configuration of the invention provides for the provision of such anamorphic imaging or broadening of the light, but with an increased anamorphic factor in comparison therewith, in order to achieve a reduced number of pixels per degree of viewing angle in an individual segment of the spatial light modulator device according to the invention. For example, the anamorphic factor may be doubled from 2.1:1 to 4.2:1.

So that there is also the desired or required resolution of for example 60 points per degree of viewing angle for a user who is meant to see a reconstructed three-dimensional (3D) scene within a large field of view by superposition of a plurality of light beams, in particular of a plurality of segments of the spatial light modulator device, the pixels of the spatial light modulator device may preferably have a reduced fill factor or additional focusing elements, for example a microlens arrangement. For example, in a spatial light modulator device, for example a microdisplay, which has mirrors as modulation elements, for example a MEMS-based spatial light modulator device, the mirror surfaces may also be curved in order to achieve a similar effect as with a microlens arrangement.

In one advantageous configuration of the invention, the spatial light modulator device used here may therefore be designed as a MEMS micromirror-based spatial light modulator device or MEMS mirror-based spatial light modulator device. Mirrors of the MEMS micromirror-based spatial light modulator device may preferably comprise a curved surface in order to achieve particular optical effects, for example required focusings.

In another configuration of the invention, it may advantageously be provided that, in the case of a lateral offset of the light of 1/N of the pixel extent, where N≠1, object points of a two-dimensional or three-dimensional scene are divided according to their position in an observer region into N subregions, to which N subscenes are assigned. In order to be able to generate or reconstruct a two-dimensional (2D) or three-dimensional (3D) scene by using the display device according to the invention with a high resolution, it is advantageous for the object points of the scene to be divided between the subscenes or subimages to be sequentially displayed in succession.

In the case of a two-dimensional scene or a stereo scene, or stereo image, for a horizontal light displacement by one half (½) of a pixel extent, for example, the object points of the scene would be divided between even and odd columns of the spatial light modulator device and assigned to these. For a first subscene or subimage, the even columns are respectively written into the spatial light modulator device, the odd columns being written into the spatial light modulator device for a second subscene or subimage.

Also in the case of a holographic display device, or display, with single-parallax encoding, it may advantageously be provided that the object points of a three-dimensional scene are divided or subdivided according to their position in the viewing region, also referred to as a frustum, in such a way that they are assigned to either a first or a second subscene, or to a plurality of subscenes. For the first subscene, holograms or subholograms are then calculated and summed to form a total hologram, and written as a first hologram into the spatial light modulator device. For the second subscene, holograms or subholograms are likewise calculated and summed to form a total hologram, and written as a second hologram into the spatial light modulator device. In the case of a light displacement or light offset by means of the beam offset device, which provides an offset of less than one half (½) pixel extent, it is advantageous for division of the two-dimensional image or of the stereo image or of the object points of a three-dimensional scene to be carried out into more than 2 groups or subregions. If the object points or the image are assigned to more than two subscenes, procedure is carried out according to the descriptions above and a corresponding number of holograms are written successively into the spatial light modulator device. The individual holograms are in this case rapidly reconstructed in succession in such a way that the reconstructed subscenes construct the complete three-dimensional scene and an observer can observe this three-dimensional scene without restrictions.

The present object is furthermore achieved by a method as claimed in claim 24.

The method according to the invention for representing a two- and/or three-dimensional scene with a high resolution is carried out in that a spatial light modulator device comprising pixels is illuminated with light, and a beam offset device is controlled in such a way that a lateral offset of the light modulated by the pixels of the spatial light modulator device by less than one pixel extent is carried out.

Advantageously, by means of an optical system, segments of the spatial light modulator device are generated in an observer region, the beam offset device being controlled in such a way that the individual segments are merged while being displaced with respect to one another by less than one pixel extent.

With the aid of the optical system, anamorphic imaging or broadening of the segments of the spatial light modulator device may be carried out.

There are now various possibilities for advantageously configuring the teaching of the present invention, and/or for combining the above-described exemplary embodiments or configurations with one another. To this end, on the one hand, reference is to be made to the patent claims dependent on the independent patent claims, and on the other hand to the following explanation of the preferred exemplary embodiments of the invention with the aid of the drawings, in which preferred configurations of the teaching are also generally explained. The invention will in this case be explained in principle with the aid of the exemplary embodiments described.

BRIEF DESCRIPTION OF THE DRAWINGS

In the figures:

FIGS. 5(a) and 5(b): show a schematic representation of a comparison of tiling according to the prior art (a) with tiling according to the invention (b) in conjunction with anamorphic broadening of the light.

It should briefly be mentioned that elements/parts/components which are the same also have the same references in the figures.

DETAILED DESCRIPTION OF THE INVENTION

Figure 1:
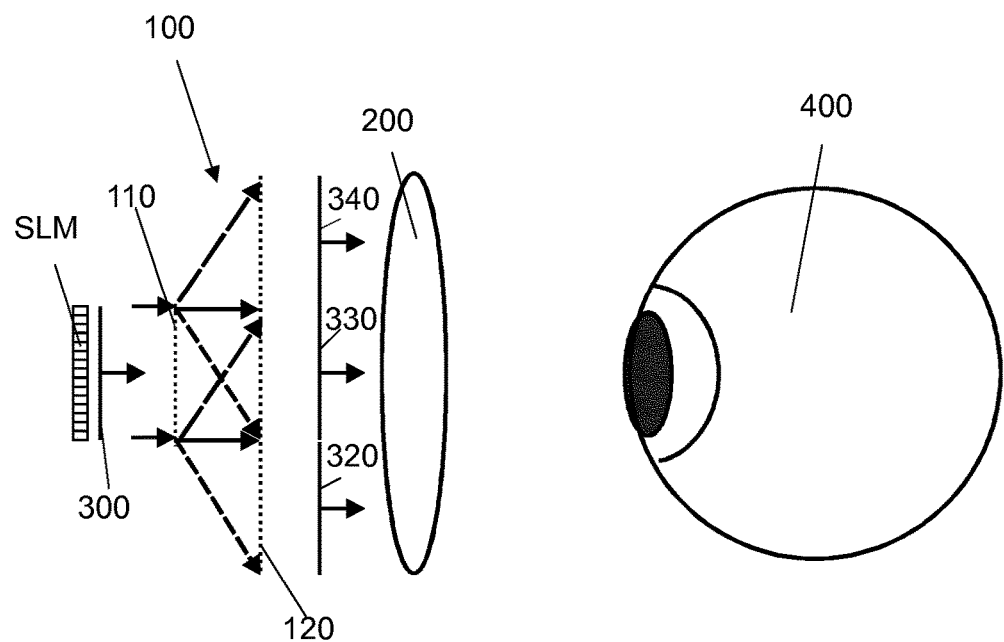
FIG. 1: shows a schematic representation of a holographic display device, or a display, according to the prior art with a light deflection device.
Figure 2:
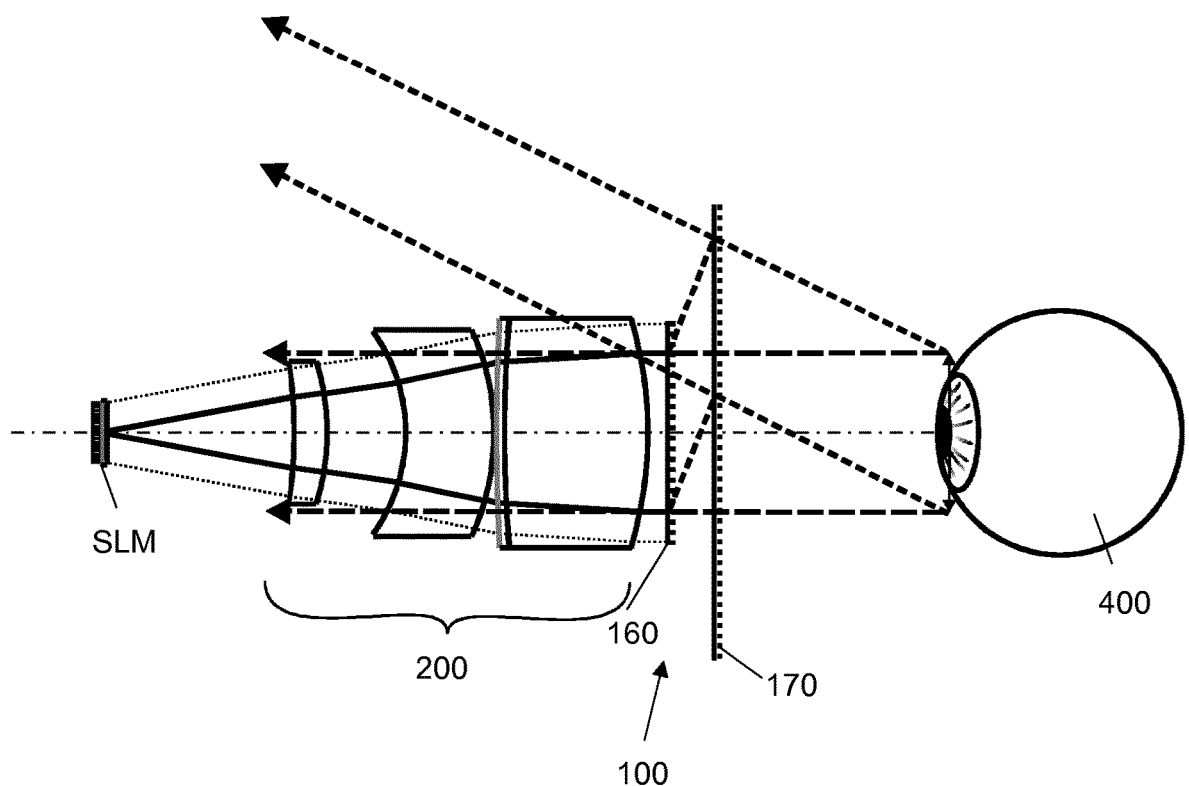
FIG. 2: shows a schematic representation of the light deflection device according to FIG. 1 behind a magnifying lens system, according to the prior art.
Figure 3:
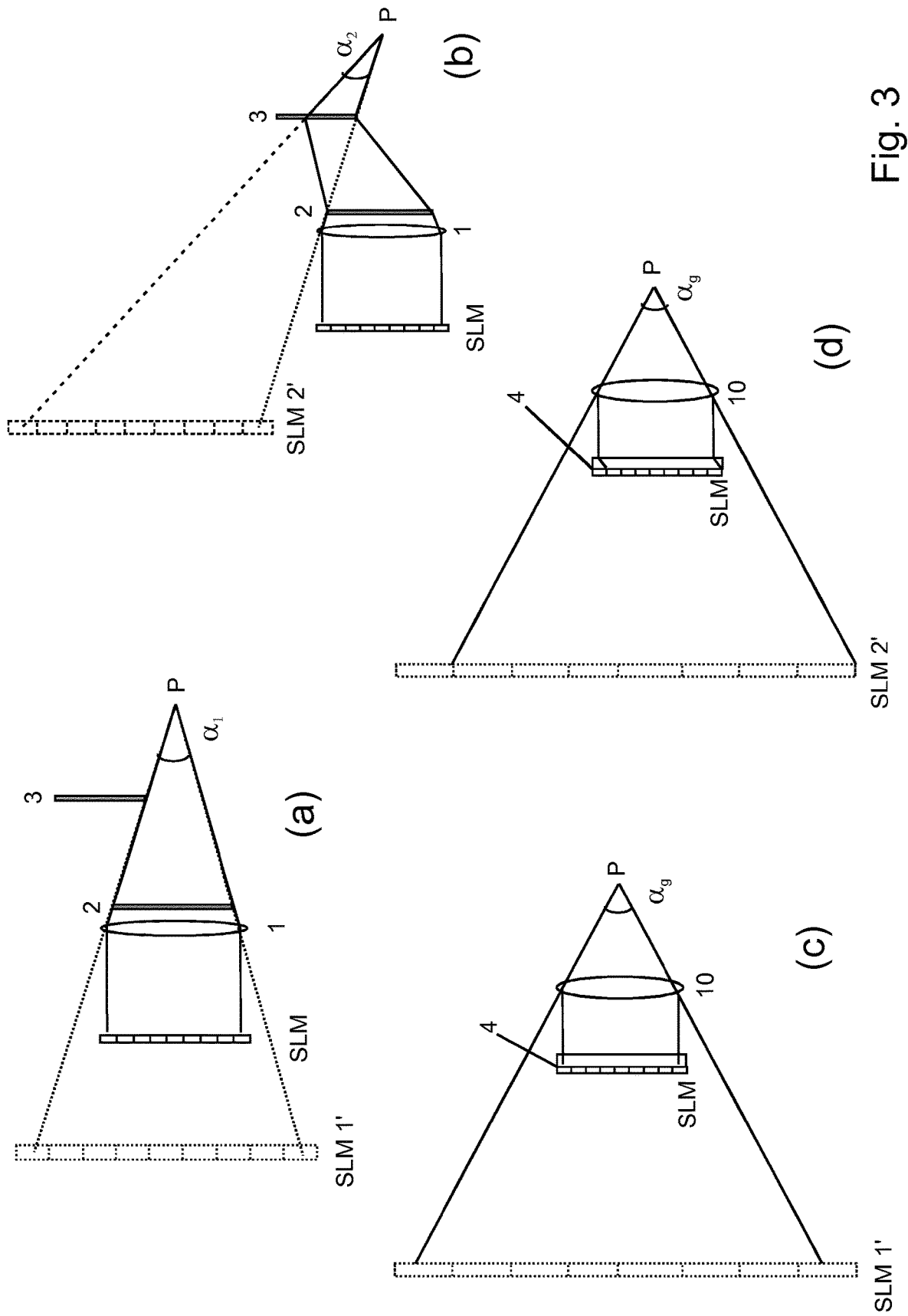
FIGS. 3(a), 3(b), 3(c), and 3(d): show in representations (a), (b), (c) (d) a comparison of a display device according to the prior art and a display device according to the invention.

FIG. 3 schematically represents a comparison of a display device according to the prior art, similar to FIG. 2, and a display device according to the invention.

Representations (a) and (b) of FIG. 3 show a display device according to the prior art. Representations (c) and (d) represent a display device according to the invention.

The display device according to illustration (a) comprises a spatial light modulator device, referred to below as an SLM, and an optical system 1, which in this case comprises a lens. In the general case, as shown in FIG. 2, the optical system 1 may also be an imaging system consisting of a plurality of lenses. Furthermore, the display device comprises two deflecting elements 2 and 3, which are configured to be switchable but are not switched, or are switched off, in illustrations (a) of FIG. 3. The SLM is in this case illuminated with an illumination device (not represented here), which comprises at least one light source. According to illustration (a), the light modulated by the pixels of the SLM passes through the optical system 1, and therefore the lens, so that the light of different pixels of the SLM is focused at a focal point P.

If a user looks through a virtual visibility region in an observer plane (sweet spot or viewing window), an image of the SLM is visible for him as a first segment or tile SLM 1'. In the schematic illustration (a), the magnification factor is equal to 2. In head-mounted displays, the magnification factor would in real cases rather lie in the range of 10-20.

Illustration (b) of FIG. 3 represents the same display device as illustration (a), although the two deflection elements 2 and 3 are now switched on in order to generate a further segment SLM 2' of the image of the SLM. Because of the light path modified by the deflection elements 2 and 3, the image, which is visible from the virtual visibility region, of the SLM is now offset in comparison with illustration a).

The segments in illustrations (a) and (b) of FIG. 3 are respectively visible from the observer plane at a viewing angle $\alpha_1$ and $\alpha_2$, respectively. The merging of the two represented segments SLM 1' and SLM 2' leads to an increased viewing angle which corresponds approximately to the sum of the two viewing angles, $\alpha_1+\alpha_2$.

For example, the focal length of the optical system 1, in this case the lens, and the distance of the SLM from the optical system 1 may be adapted so that an image of the SLM with about 60 pixels per degree of viewing angle is obtained for an SLM having a particular pixel number and a defined pixel pitch. For an SLM with HDTV (high-definition television) resolution, i.e. 1920×1080 pixels, for example in the direction which comprises 1920 pixels, both the viewing angle $\alpha_1$ and the viewing angle $\alpha_2$ would then both be 32 degrees (1920/60). The merging of the two segments would therefore give approximately a field of view of 64 degrees.

If, for example, diffraction gratings are used for the light deflection, aberrations may therefore occur in the second segment. In this display device according to illustrations (a) and (b), the aberrations of the first segment generated with the deflection elements 2 and 3 switched off therefore differ significantly from the aberrations of the second segment with the deflection elements 2 and 3 switched on. The imaging system, or the optical system 1, would therefore generally also require dynamic elements for the aberration correction, which need to be switched on and off together with the deflection elements 2 and 3.

Illustration (c) of FIG. 3 shows a display device according to one configuration of the invention. This display device likewise comprises an illumination device (not represented) with at least one light source for illuminating the SLM, and an optical system 10. The optical system 10 comprises an imaging device having at least one imaging element, for example a lens or mirror, In the general case, however, the imaging device comprises a plurality of imaging elements, for example a plurality of lenses or mirrors. In this exemplary embodiment, for comparison purposes, the same SLM as in illustrations (a) and (b) is used, with the same number of pixels and the same defined pixel pitch. A beam offset device 4 is provided immediately after the SLM in the light direction. The beam offset device 4 may also be connected directly to the SLM, i.e. the beam offset device 4 may be mounted directly on the SLM. The beam offset device 4 is configured to be controllable or switchable. In illustration (c) of FIG. 3, the beam offset device 4 is represented in a switched-off state and does not therefore generate an offset of the incident light. This means that the light emitted by the illumination device strikes the pixels of the SLM and is modulated there according to the preferably three-dimensional scene to be generated. The modulated light is then incident on the beam offset device 4 and passes through it without modification, i.e. the beam offset device 4 in the state not switched on does not generate a displacement or offset of the incident light. This light emitted by the beam offset device 4 strikes the optical system 10, and is focused by the latter at its focal point P. In this case as well, with the optical system 10 a magnified image of the SLM, namely the segment SLM 1', visible from a virtual visibility region, for example a sweet spot or viewing window, is generated in a viewing region. Since the display devices of illustrations (a) to (d) are in this case represented as a head-mounted display, the viewing region of the observer plane extends beyond the SLM so that the generated segments of the SLM occur both before and after the SLM as seen from the observer plane.

In comparison with illustrations (a) and (b) of FIG. 3, in illustrations (c) and (d) although the same distance of the SLM from the virtual visibility region (sweet spot or viewing window) is selected, a stronger magnification of the image of the SLM is however achieved because of a modified configuration of the optical system 10. This means that the optical system 10 now in this case has an imaging element which has a shorter focal length than the imaging element of the optical system 1 of illustrations (a) and (b). In the example of illustrations (c), a magnification factor of 4 is selected, i.e. two times the value compared with illustrations (a) and (b) of FIG. 3.

This leads to a viewing angle $\alpha_g$ for the individual segment SLM 1', which is now about two times as large in its extent or size as the segment SLM 1' or SLM 2' in illustrations (a) and (b) of FIG. 3. Since the image of the individual pixels of the SLM is also more greatly magnified, however, there are only half as many pixels per degree of viewing angle in segment SLM 1', or in the image of the SLM. Here, in illustration (c), there are 30 pixels/degree of viewing angle, although they should of course only be regarded as an example.

In illustration (d) of FIG. 3, on the other hand, the beam offset device 4 can be seen in a switched-on state so that an offset or displacement of the light of one half of a pixel extent can be generated in comparison with the entry light. The SLM, now offset by means of the beam offset device 4 by one half of a pixel extent, in comparison with the SLM of illustration c) is imaged with the optical system 10 so that the generated segment SLM 2' or the image of the SLM is offset or displaced by one half (½) of a pixel extent with respect to the segment SLM 1' of illustration (c).

This leads to a segment SLM 2' with the same, or at least approximately the same, viewing angle $\alpha_g$ as the segment SLM 1' of illustration (c), but with an offset of the light by one half of a pixel extent. Both segments SLM 1' and SLM 2' have the same, or at least approximately the same, viewing angle $\alpha_g$, yet seen together, i.e. when the two segments SLM 1' and SLM 2' are superimposed with the offset of the half pixel extent, a doubled resolution of, in this example, 60 pixels/degree of viewing angle (per segment, 30 pixels/degree of viewing angle).

The display device shown in illustration (d) of FIG. 3 therefore leads to an increased resolution in pixels per degree of viewing angle in one dimension or direction, for example the horizontal direction, but an unchanged resolution in the other dimension or direction, for example the vertical direction. This fact relates to single-parallax encoding. In the case of full-parallax encoding, the resolution in pixels per degree of viewing angle would be increased in both dimensions or directions, i.e. horizontally and vertically.

In an SLM with almost squarely configured pixels, the use of horizontal light displacement or a horizontal light offset by means of the beam offset device would lead to different numbers of pixels per degree of viewing angle in the horizontal direction and in the vertical direction. This effect may be compensated for by carrying out light displacement or a light offset both in the horizontal direction and in the vertical direction.

Another possibility, in an optical system by means of which imaging of the SLM is carried out, is offered by providing or using different magnifications of the SLM in the horizontal and in the vertical direction. This imaging is also referred to as anamorphic imaging. An SLM is for example imaged with magnification by a factor of 2 in the horizontal direction, but in the vertical direction the SLM is imaged 1:1, i.e. without magnification. And if a horizontal light displacement or light offset by one half (½) of a pixel extent is then carried out, the generated segment of the SLM, or the image of the SLM, consequently has a different ratio of height to width than the SLM itself. Nevertheless, there are still the same numbers of pixels per degree of viewing angle in the horizontal direction and in the vertical direction.

Figure 4:
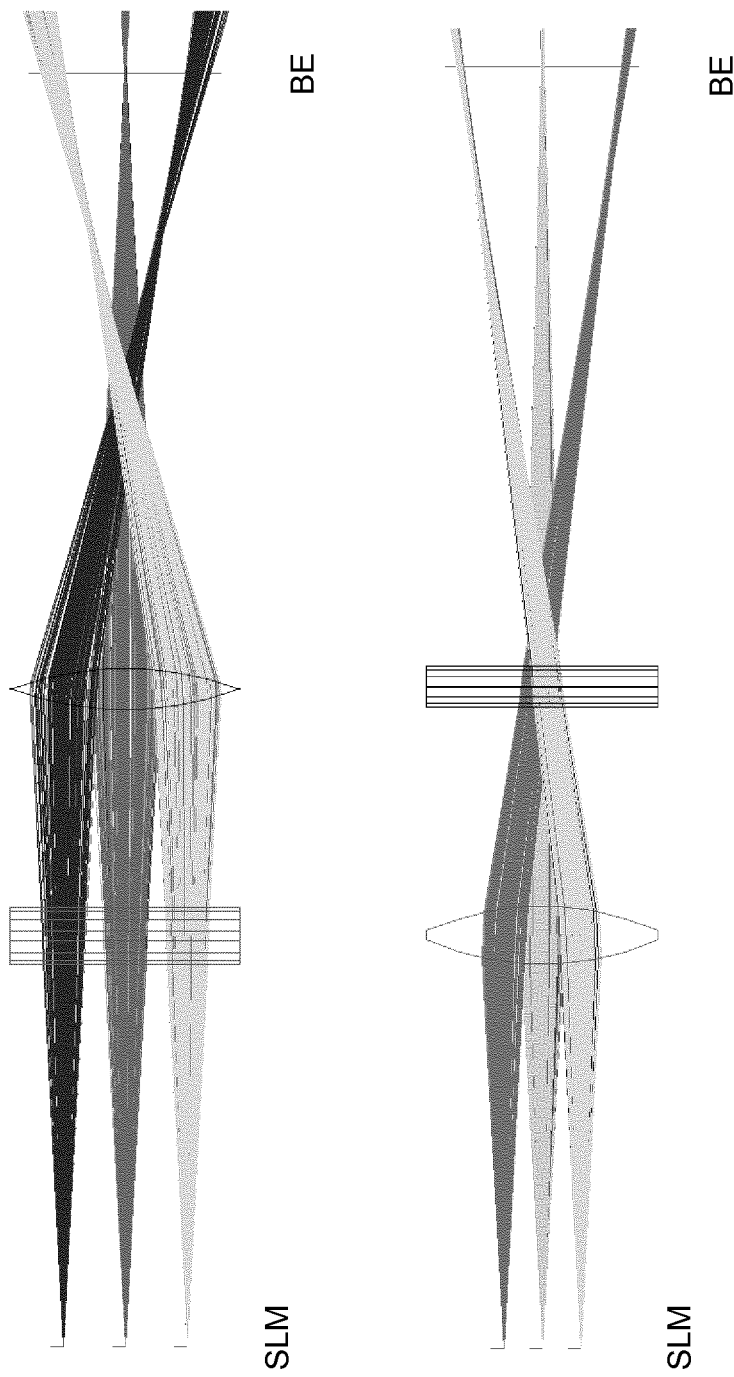
FIG. 4: shows a schematic representation of the principle of anamorphic broadening of light by means of deflection elements according to the prior art.

FIG. 4 shows the principle of an arrangement for anamorphic broadening of the light according to the prior art. According to FIG. 4, an arrangement of two crossed cylindrical lenses with different focal lengths is used. In the upper arrangement of FIG. 4, a section is shown in a plane in which only the lens arranged on the right-hand side is focused. In the lower arrangement of FIG. 4, a section is shown in a plane in which the lens arranged on the left-hand side is focused. The lens of the upper arrangement and the lens of the lower arrangement are respectively at a distance from the object, the SLM, the distances being different to one another. FIG. 4 shows light rays which come from three different pixel rows and respectively three different pixel columns of the SLM. The imaging of the pixel rows or pixel columns is, however, carried out in such a way that there is a common image plane of these pixel rows and pixel columns. This position of the common image plane is shown by the vertical black line and is provided with the reference BE. The imaging scale in this case differs in the vertical direction (upper arrangement) and horizontal direction (lower arrangement). In this example, according to the upper arrangement imaging of the light on the scale 1:1 is approximately carried out in one direction, in this case the vertical direction, and according to the lower arrangement magnified imaging of the light on the scale 2:1 is carried out in the other direction, in this case the horizontal direction. The SLM itself is rectangularly designed in this exemplary embodiment so that the image of the SLM is generated approximately squarely in its shape.

According to the invention, a beam offset device is provided after the SLM in the light direction, which offsets or displaces the light in the horizontal direction and/or vertical direction. The light, emerging from the SLM or the beam offset device while being displaced for example by one half (½) of a pixel extent is imaged by the optical system. The beam offset device is configured to be controllable or switchable. By combination of the two switching states ON/OFF of the beam offset device, the same number of pixels per degree viewing angle is set in the generated segment of the SLM or in the generated image of the SLM. This could, for example, be used both for a two-dimensional display device, or display, and for a stereo 3D display device.

FIG. 4 shows a possibility of carrying out anamorphic broadening of the light. There are, however, also other arrangements according to the prior art which may be used for such anamorphic broadening of the light. The use of anamorphic broadening of the light according to the invention is therefore not intended to be restricted to the example shown in FIG. 4.

For certain applications, for example holography with single-parallax encoding, different high pixel densities, i.e. pixels per degree of viewing angle, are required in the horizontal direction and in the vertical direction. For example, for single-parallax encoding with a virtual visibility region with a size of about 7 mm, as already mentioned there would be 250 complex-valued pixels per degree of viewing angle in the encoding direction and 60 complex-valued pixels per degree of viewing angle in the direction perpendicular thereto. By the use of a beam offset device which displaces or offsets the light perpendicularly to the encoding direction, a resolution in this direction can be increased. This means that the pixel density can be reduced in this direction. In this example, this means that a pixel density even smaller than 60 complex-valued pixels/degree viewing angle may be provided, for example only 30 complex-valued pixels per degree of viewing angle.

In both cases, with or without light displacement or light offset by means of the beam offset device, the different pixel density per degree of viewing angle can be adjusted by anamorphic broadening of the light. For the beam offset device, however, the factor of the anamorphic broadening of the light is provided in an increased way in comparison with an arrangement without a beam offset device.

An arrangement for anamorphic broadening may also be used in order, in a head-mounted display (HMD) with single-parallax encoding with the use of an SLM having squarely configured pixels, to achieve a high pixel density, for example 250 pixels/degree viewing angle, in one direction or dimension and a low pixel density, for example 30 pixels/degree viewing angle, in another direction.

One particular possible use of light displacement in combination with anamorphic broadening of the light by oblique illumination of a volume grating is shown in principle in FIG. 5. For anamorphic broadening of the light of two segments or tiles, according to FIG. 5 a grating element, in this case a volume grating, is used. Illustration (a) shows conventional broadening of the light of two segments with a grating element according to the prior art, and illustration (b) shows broadening of the light of two segments which are superimposed while being slightly displaced with respect to one another by means of a beam offset device.

In illustration (a), two segments S1 and S2 lying next to one another are generated, for example by the segments S1 and S2 being placed next to one another by means of deflection elements at defined positions. The light of the two segments S1 and S2 in this case, for example, strikes a grating element 5, which is designed as a volume grating, at an angle of about 64° at different positions. The grating element 5 deflects the light in such a way that the light rays emerge from the grating element 5 parallel to one another and perpendicularly to the surface of the grating element. Because of the angle of incidence of about 64° in this case, the light strikes an area increased by a factor of 2.25 (1/cos 64°) in comparison with the area F, shown by the double arrow, of the light beam perpendicularly to the incidence direction.

In illustration (b) of FIG. 5, in order to facilitate comparison of the conventional broadening of light of two segments and broadening of light of two segments which are arranged slightly offset with respect to one another according to the invention, a grating element 5 is likewise provided. In this case, the light of two segments S1 and S2, which is mutually offset by only one half (½) of a pixel extent, is incident on the grating element 5 for example at an angle of about 77°. The light rays are deflected by the grating element 5 and emerge from the latter mutually parallel and perpendicularly to the surface of the grating element 5. The area of the emerging light is in this case increased by a factor of 4.5 in comparison with the area F, shown by the double arrow, of the entering light beam perpendicularly to the incidence direction.

As can be seen in FIG. 5, the light exit area is equally large in both cases, i.e. in illustrations (a) and (b). If the light were subsequently focused by an optical system, for example by a lens being arranged after the grating element 5 in the light path, in both cases of FIG. 5 the same viewing angle could be generated. According to illustration (b), however, the diameter of the light beam of the two segments S1 and S2 together is less before entry into the grating element 5. In this way, it is possible to achieve more compact optics which can be used in the display device. The light path is essentially the same, or equally long, in both segments S1 and S2 of illustration (b).

According to illustration (b) of FIG. 5, fewer pixels per degree of viewing angle are achieved in each individual segment S1 and S2 because of the stronger broadening of the light. Since the segments S1 and S2 are displaced or offset with respect to one another only by one half (½) of a pixel extent, however, the same number of pixels per degree of viewing angle is again achieved overall since there is almost complete superposition of the two segments S1 and S2.

As already mentioned, the invention is not intended to be restricted to the use of volume gratings as grating elements for anamorphic broadening of the light. Anamorphic broadening of the light may also be achieved in another way. Furthermore, anamorphic broadening is not the only way of broadening or increasing the light beam. This could, for example, also be carried out by means of a lens system or other optical systems, as described in FIG. 3. It is likewise possible not to carry out broadening of the light beam, in particular not after light displacement or a light offset.

Figure 6:
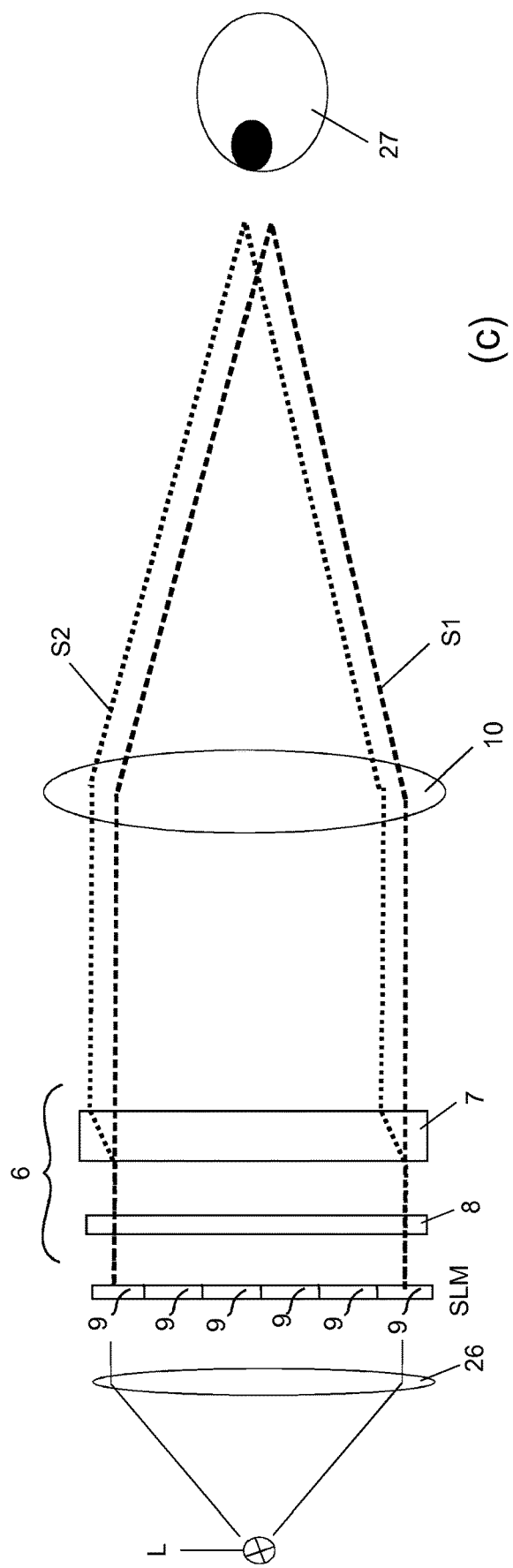
FIGS. 6(a), 6(b) and 6(c): show in principle a representation of a beam offset device for generating a light offset by one half of a pixel extent.

FIG. 6 shows an SLM and a beam offset device 6 for generating a light displacement or a light offset of one half of a pixel extent. The beam offset device 6 here in this exemplary embodiment comprises a birefringent optical element 7 and a switch device 8. The birefringent optical element 7 is designed in this case as a birefringent plate of suitable thickness. The switch device 8 is configured to be controllable or switchable. Furthermore, the switch device 8 comprises a polarization switch, which is often also referred to as a switch. The SLM comprises pixels or modulation elements 9, which correspondingly modulate in amplitude and/or phase the light which is emitted by an illumination device L and is incident.

In order to generate a first segment of the SLM in an observer region by means of the beam offset device 6, the switch device 8, in this case the polarization switch, is in an off state, as shown in illustration (a) of FIG. 6. The incoming light of all the pixels 9 passes through the birefringent optical element 7 without an offset, i.e. the light is not influenced by the beam offset device 6. In order to generate a second segment, however, the switch device 8, particularly in this case the polarization switch, is in the on state, as shown in illustration (b) of FIG. 6. The light modulated by all the pixels 9 of the SLM and incident on the beam offset device 6 therefore experiences a lateral offset. In this exemplary embodiment, the offset is equal to one half (½) of a pixel extent, as can be seen clearly in illustration (b). In the exemplary embodiment according to FIG. 6, the light of all the pixels experiences the same lateral offset. This means that the modulated light beams which come from each individual pixel 9 of the SLM are each laterally displaced or offset by one half of a pixel extent by means of the beam offset device 6.

Illustration (c) of FIG. 6 schematically shows the use of the beam offset device 6 in a display device, which may for example be designed as a head-mounted display.

The SLM is illuminated with an illumination device L, which comprises at least one light source. In this exemplary embodiment, an optical element 26, in this case a lens, provided between the illumination device L and the SLM, is used for collimated illumination of the SLM. The light then passes through the SLM and the beam offset device 6. Depending on the drive state of the switch device 8 provided in the beam offset device 6, either a first segment S1, which is generated without an offset, or a second segment S2, which is generated with an offset, is generated. In illustration (c) of FIG. 6, the two segments S1 and S2, which are generated time-sequentially in succession, are shown schematically, although simultaneous generation of the segments S1 and S2 would likewise be possible.

By means of an optical system 10, which comprises at least one imaging element, the light of the two segments S1 and S2 is then focused in the direction of an eye 27 of an observer. An observer would in this exemplary embodiment see a magnified virtual image of the SLM. If the two segments S1 and S2 are displayed with a sufficiently high frequency, for example at 120 Hz, for example, chronologically in succession, an observer perceives a combination of the two segments S1 and S2, therefore like the image of an SLM with two times the pixel resolution.

Illustration (c) of FIG. 6 is not true to scale. For the two segments S1 and S2, a slightly offset focus may also occur in the focal plane. This offset of the foci with respect to one another is, however, likewise less than one pixel extent. This offset is therefore also significantly smaller in its size than the pupil of an observer's eye, or of the human eye, which is schematically shown in illustration (c) by reference 27.

Figure 7:
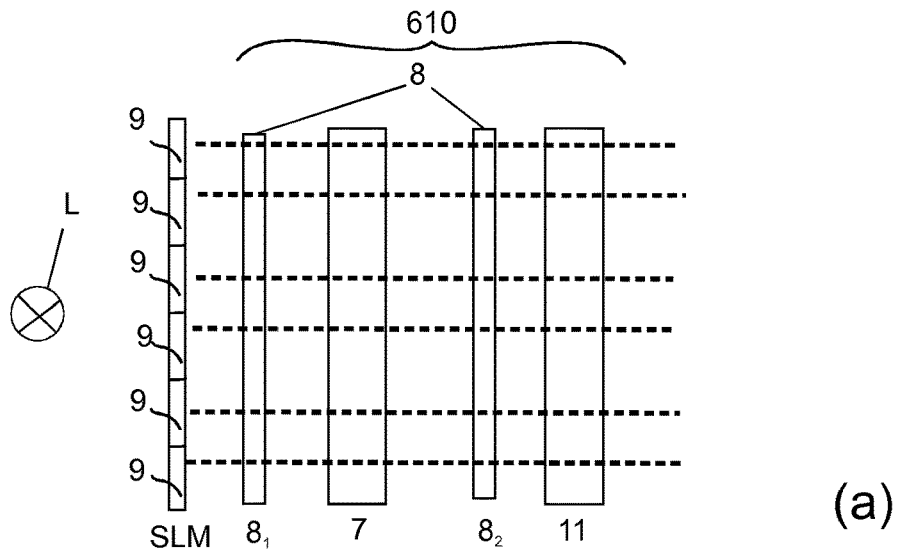
FIGS. 7(a), 7(b) and 7(c): show in principle a representation of a further configuration of a beam offset device according to the invention.
Figure 7:
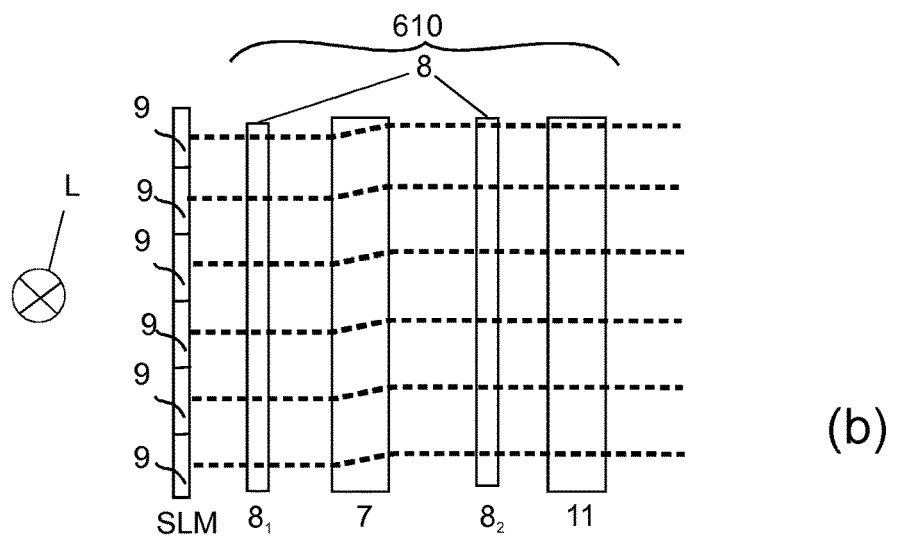
Figure 7:
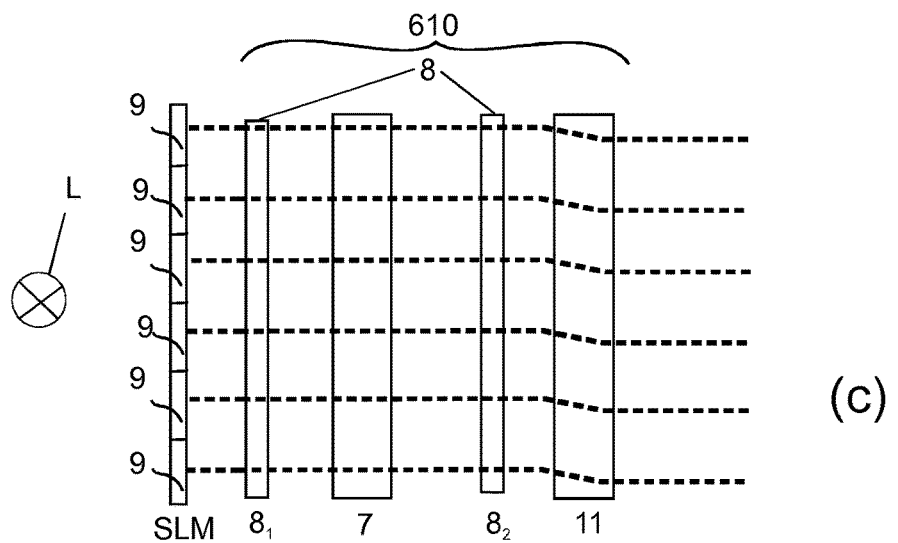

FIG. 7 shows a beam offset device 610 in conjunction with the SLM, in this exemplary embodiment the beam offset device 610 comprising two birefringent optical elements 7 and 11 in contrast to FIG. 6. In this case as well, birefringent optical elements 7 and 11 are designed and shown for the sake of simplicity as birefringent plates. The switch device 8 comprises two polarization switches. The two polarization switches are assigned to the two birefringent optical elements 7 and 11. In other words, the beam offset device 610 respectively comprises alternately a polarization switch and a birefringent optical element, the SLM being followed in the light direction first by a polarization switch of the switch device 8. The beam offset device 610 may be controlled or switched in such a way that the light modulated by all the pixels 9 of the SLM selectively experiences no offset or an offset of ⅓ of the pixel extent in one lateral direction or an offset of ⅓ of the pixel extent in the opposite lateral direction. With such a beam offset device 610, three segments of the SLM can be generated in the viewing region. In general, this means that, in order to generate N segments of the SLM in the viewing region, a displacement of the light, and therefore a displacement or offset of the individual generated segments with respect to one another, by a value of 1/N of the pixel extent is provided, where N≠1.

For the exemplary embodiment according to FIG. 7, this means that, in order to generate a first segment of the SLM, the switch device 8, i.e. both polarization switches, is in an off state, as shown in illustration (a) of FIG. 7. The light striking the beam offset device 610 passes through the two birefringent optical elements 7 and 11 without experiencing any offset. This means that the two birefringent optical elements 7 and 11 do not influence the incident light passing through.

In order to generate a second segment of the SLM in the viewing region, the switch device 8 is switched on. The switch device 8 is controlled or switched in such a way that one polarization switch $8_1$, may also be referred to here as a first polarization switch, is put into an on state, the polarization switch $8_2$ being switched off, or in the off state. The first birefringent optical element 7 then generates an offset of the light of about ⅓ of a pixel extent in a lateral or sideways direction for incident light, as shown in illustration (b) of FIG. 7. The thickness and/or the birefringence of the birefringent optical element 7 is in this case selected or adapted in such a way that a smaller lateral offset of ⅓ of the pixel extent can in this case be generated or adjusted, and not one half (½) of a pixel extent as in FIGS. 3, 5 and 6. By selection of the thickness and/or birefringence of the birefringent optical element, a desired lateral offset of the light can therefore be adjusted. The selection of the thickness and/or birefringence of the birefringent optical element is carried out before first use of the beam offset device, and in particular before first use of the display device.

In order to generate a further, i.e. a third, segment of the SLM a further polarization switch $8_2$ of the switch device 8, may also be referred to here as a second polarization switch, is put into an on state, the polarization switch $8_1$ being switched off, or in the off state. The second birefringent optical element 11, which is assigned to the polarization switch $8_2$, then generates an offset of ⅓ of a pixel extent in the opposite lateral direction to the first lateral direction according to illustration (b). This generation of a so-called third segment of the SLM is shown in illustration (c) of FIG. 7. Such an opposite direction of the offset may, for example, be achieved by the second birefringent optical elements being arranged rotated or offset by 180 degrees relative to the first birefringent optical element.

Apart from this, instead of a birefringent optical element, it is also possible to use other optical elements or arrangements, such as are disclosed for example in WO 2010/149588 A1, in order to generate a light offset in the lateral direction. For example, an arrangement of two grating elements, for example two volume gratings or two polarization gratings, with a spacer could also be used.

Figure 8:
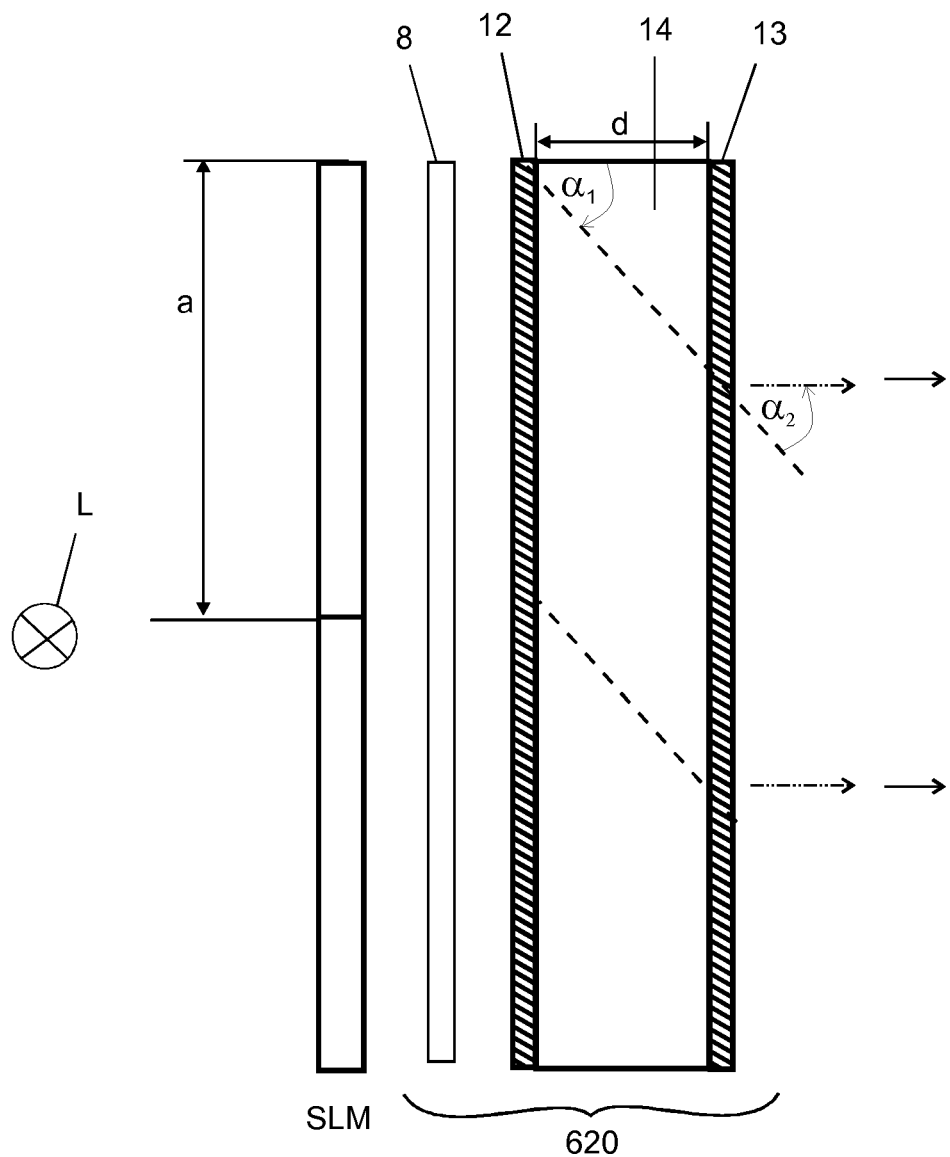
FIG. 8: shows in principle a representation of a third configuration of a beam offset device according to the invention.

Such a beam offset device 620 having two grating elements is shown in principle in FIG. 8. The beam offset device 620 shown therein comprises two volume gratings 12 and 13. The two volume gratings 12 and 13 are spaced apart from one another. A spacer 14 could therefore be provided between the two volume gratings 12 and 13. The volume gratings 12 and 13 are configured to be polarization-selective in this exemplary embodiment. Depending on the switching state of the switch device, i.e. ON or OFF, the light is transmitted through the volume gratings 12 and 13 either while being laterally offset or without an offset. By the selection of a defined thickness d of the distance or of the spacer 14 between the volume gratings 12 and 13, it is possible to predetermine or generate a desired lateral offset of the light of fractions of a pixel, or of a pixel extent a, for example one half (½) of a pixel extent. The selection of the thickness of the distance or of the spacer between the volume gratings 12 and 13 is carried out before first use of the beam offset device 620, and in particular before first use of the display device.

Instead of a beam offset device which generates no lateral offset in the switched-off state and a lateral offset of the light by one half of a pixel extent in the switched-on state, it is optionally also possible to use a beam offset device which generates a lateral offset of the light of +¼ of a pixel extent in one switching state of the switch device and a lateral offset of the light of −¼ of a pixel extent in another switching state of the switch device.

Figure 9:
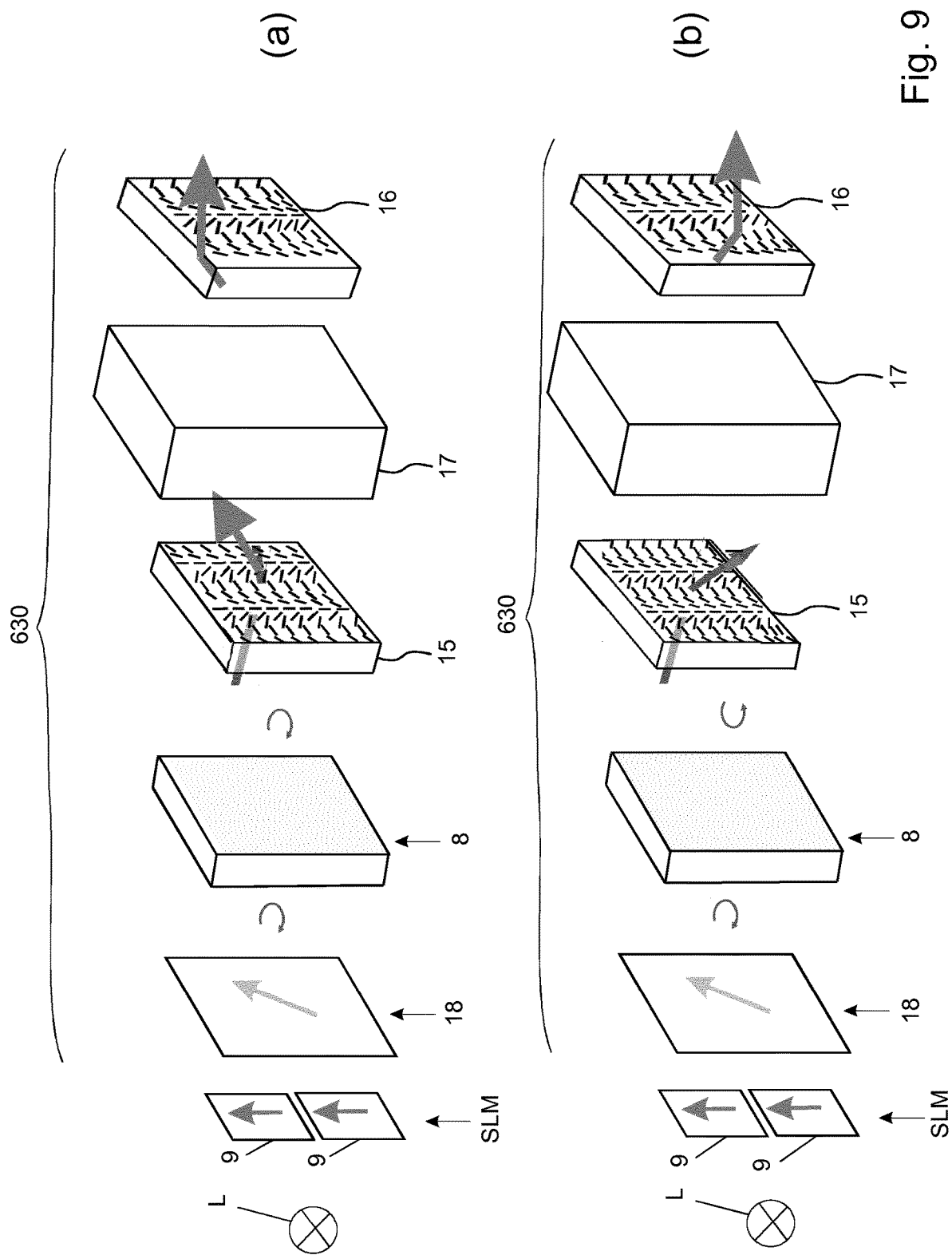
FIGS. 9(a) and 9(b): show a perspective representation of a beam offset device which generates a light offset of a ¼ pixel extent.

FIG. 9 shows a perspective view of such a beam offset device 630 after an SLM in the light direction. Besides the switch device 8, the beam offset device 630 comprises two grating elements in the form of polarization gratings 15 and 16. The polarization gratings 15 and 16 are arranged at a distance from one another. A spacer 17 may therefore be provided between the polarization gratings 15 and 16. In this case as well, as in FIGS. 6, 7 and 8, the switch device 8 is respectively arranged in the light direction before the element generating the offset of the light, in this case the polarization gratings 15, 16. Arranged before this switch device 8 in the light direction, there is a quarter-wave plate 18 for changing the polarization of the light.

An illumination device L emits light which illuminates an SLM. The pixels 9 of the SLM modulate the light according to a scene or image to be generated, linearly polarized light emerging from the SLM. By means of a quarter-wave plate 18, the linearly polarized light is converted into circularly polarized light, for example into left-circularly or right-circularly polarized light, which is intended to be shown by means of the arrow in FIG. 9. The circularly polarized light then strikes the switch device 8. In this case as well, the switch device 8 comprises a polarization switch. If the switch device 8 is switched off, as shown in illustration (a) of FIG. 9, the polarization of the light remains unchanged. Circularly polarized light therefore strikes the polarization grating 15 arranged downstream of the switch device 8. The polarization grating 15 offsets the light in the lateral direction. The further following polarization grating 16 likewise offsets the light, but by the opposite direction. The distance, or the spacer 17, between the polarization gratings 15 and 16 therefore generates a lateral offset. In this exemplary embodiment, the lateral offset is ¼ of the pixel extent in a lateral direction.

Illustration (b) of FIG. 9 shows the switch device 8 in a switched-on state. If the switch device 8 is in the on state, the incident left-circularly polarized light is thereby converted into right-circularly polarized light. The polarization grating 15, which in this case functions as a first polarization grating, then offsets the light in the opposite lateral direction to the direction shown according to illustration (a), as can be seen in illustration (b). By means of the same distance or of the spacer 17 and the further polarization grating 16, which in this case functions as a second polarization grating, an offset of the light by ¼ of a pixel extent in the opposite lateral direction to the lateral direction generated in the switched-off state of the switch device 8 can be adjusted or generated. Instead of passive polarization gratings or passive volume gratings and a switch device, it is also possible to use actively switchable or actively controllable polarization gratings or volume gratings. In this case, a spacer would be selected in such a way that it is possible to switch between a light offset of zero, i.e. there is no light offset, in which a polarization grating or a volume grating is not controlled, and a light offset of one half (½) of a pixel extent, in which the polarization grating or the volume grating is controlled. With actively switchable polarization gratings or volume gratings, it is also possible to generate an offset other than one half (½) of a pixel extent, for example an offset of ⅓ of a pixel extent or ¼ of a pixel extent. For example, switchable polarization gratings or switchable volume gratings may also be arranged in succession for an offset of either +⅓ of a pixel extent or −⅓ of a pixel extent, in a similar way as described in FIG. 7 for two birefringent optical elements and two switch devices.

In another exemplary embodiment, a beam offset device 640 is combined with a beam combiner unit 19. In this case, the beam combiner unit 19 is provided between the SLM and the beam offset device 640. This means that the beam combiner unit may be in direct contact with the SLM, and the beam offset device 640 may be in direct contact with the beam combiner unit 19. It would, however, also be possible for there to be a distance between these components.

By such a combination, in a first stage light of two phase pixels of the SLM may be combined to form a complex-valued macropixel, and in a second stage the light of all the complex-valued macropixels may be displaced with the beam offset device 640 by for example one half (½) of a complex-valued pixel extent.

Figure 10:
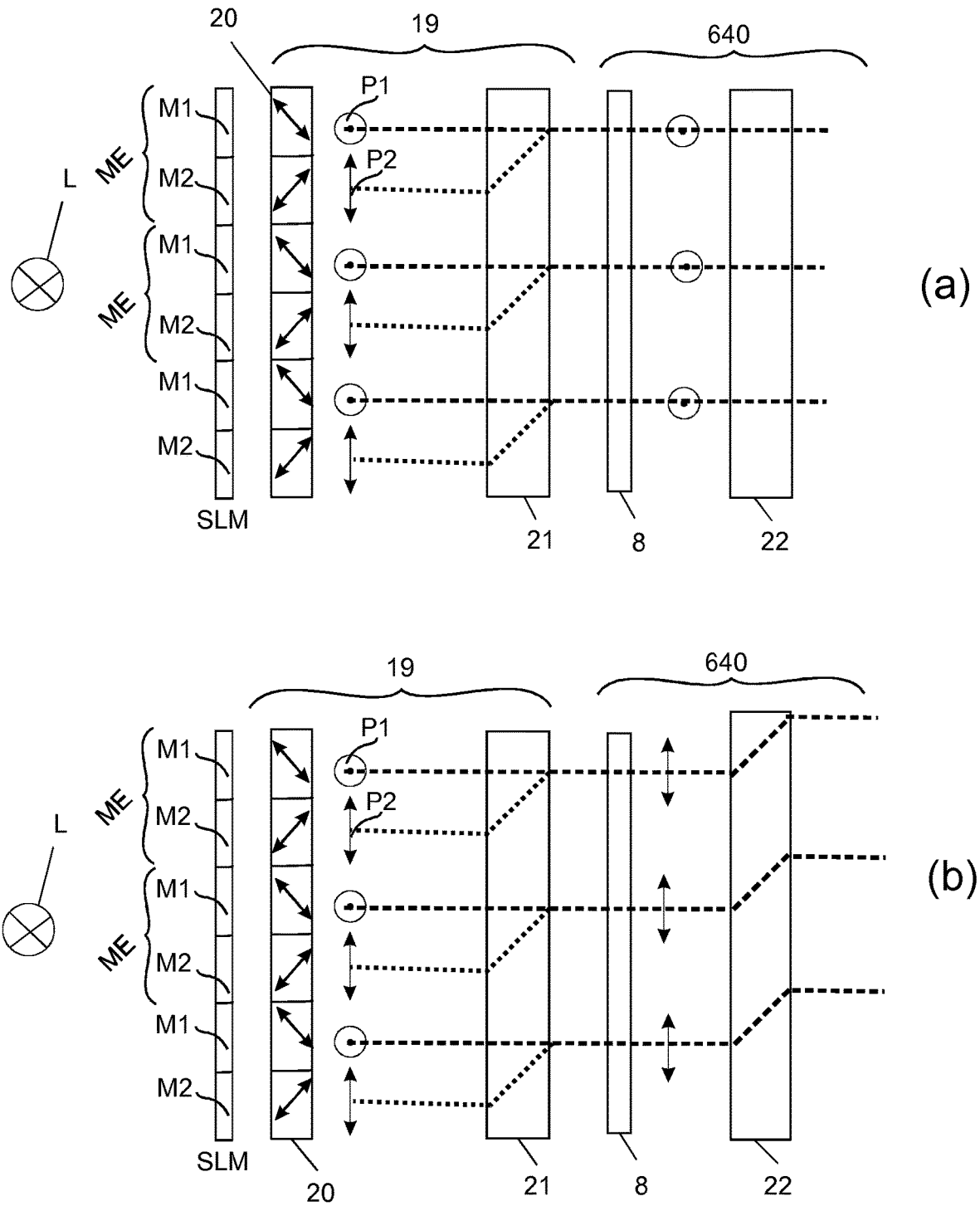
FIGS. 10(a) and 10(b): show in principle a representation of a beam offset device in conjunction with a beam combiner unit.

Such a display device is shown in FIG. 10. The beam combiner unit 19 comprises a structured retardation plate 20 and a birefringent optical element 21. The birefringent optical element 21 may, for example, be designed as a Savart plate.

Light which comes from two neighboring pixels M1 and M2 of the SLM receives different polarization states by use of the structured retardation plate 20. This means that light which comes from pixel M1 obtains a different polarization state imparted by the structured retardation plate 20 than the light which comes from pixel M2, as shown by the arrows inside the structured retardation plate 20. The light of pixel M1 is therefore impressed a polarization state P1 and the light of pixel M2 is impressed a polarization state P2. After the light beams polarized in this way, coming from M1 and M2, strike the birefringent optical element 21, the light beams of the two pixels M1 and M2, shown by respectively differently dashed lines, travel different optical paths inside the birefringent optical element 21. The two light beams are then combined at the exit of this birefringent optical element 21 so that the two pixels M1 and M2 are combined to form a macropixel ME.

Arranged after the beam combiner unit in the light path is the beam offset device 640. The beam offset device in this case comprises a switch device 8 and a birefringent optical element 22. The birefringent optical element 22 may, for example, be designed as a Savart plate. Since the polarization of the light at the exit of the beam combiner unit 19 is rotated by 45 degrees, it is for example possible to use a switch device 8 which generates or causes a vertical polarization in one switching state and a horizontal polarization in another switching state. Inside the birefringent optical element 22, depending on the switching state of the switch device 8, the light of all the macropixels ME is either undisplaced or not offset, or displaced or offset by one half (½) of a macropixel extent, or pixel extent. In illustration (a), the switch device 8 is in an off state so that the light of all the pixels or macropixels is not offset when passing through the beam offset device 640. In illustration (b), the switch device 8 is in an on state so that, as can be seen, the light is respectively offset by one half of a (macro)pixel extent.

In the display device shown according to FIG. 10, the beam combiner unit 19 and the light displacement are used in the same lateral or sideways direction, namely the vertical direction. It is however also possible, for example, to combine two pixels with a beam combiner unit in the horizontal direction and to generate or achieve a light displacement by one half (½) of a pixel extent in the vertical direction by means of a beam offset device.

Figure 11:
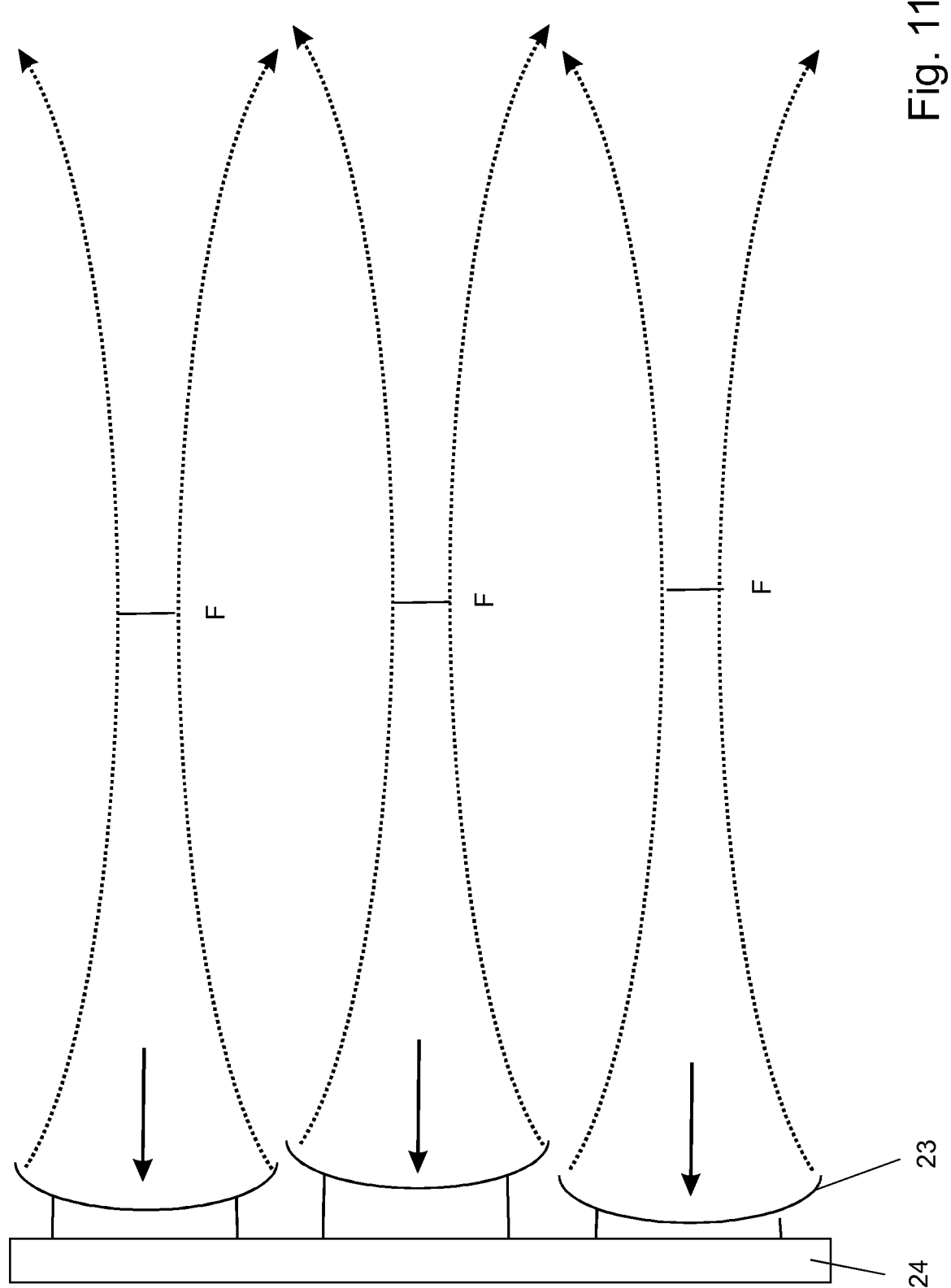
FIG. 11: shows a schematic representation of a MEMS micromirror-based spatial light modulator device.

FIG. 11 shows an arrangement of mirrors or micromirrors (MEMS) 23 with a slightly curved surface, which could constitute a MEMS micromirror-based spatial light modulator device (SLM). This arrangement in this case generates a focus for the incident light close to the mirrors or micromirrors 23. As can be seen, collimatedly incident light, which is shown by arrows arriving from the right, strikes the curved surfaces of the mirrors or micromirrors 23. After reflection of the light on the mirrors or micromirrors 23, the light is focused because of the curvature of the mirrors. At a defined distance from the mirrors or micromirrors 23 a diffraction-limited focus F is therefore formed, with a reduced diameter in comparison with the size of the mirrors or micromirrors 23.

The mirrors or micromirrors 23 in this exemplary embodiment generate a phase modulation by a different piston stroke, which is schematically illustrated by the different position of the mirrors or micromirrors 23 from a substrate 24, on which the mirrors or micromirrors 23 are mounted. The illustration is not, however, intended to be true to scale. The focal length of the curved mirrors or micromirrors 23 may lie in the range of a few tens of micrometers to several millimeters. The piston stroke of the mirrors or micromirrors 23 is much less than 1 micrometer.

This arrangement acts as a MEMS pixel with a relatively low fill factor, yet since light is reflected and focused by the entire mirror surface, without the disadvantage that a part of the incident light is lost because of the fill factor.

In the case of anamorphic imaging or broadening of the light, gaps are therefore formed between the individual pixel images, and these may be filled by the mutually offset segments of the SLM. In a similar way, the pixels of a transmissive SLM may be provided with microlenses which would likewise provide a reduced focus compared with the pixel size.

Figure 12:
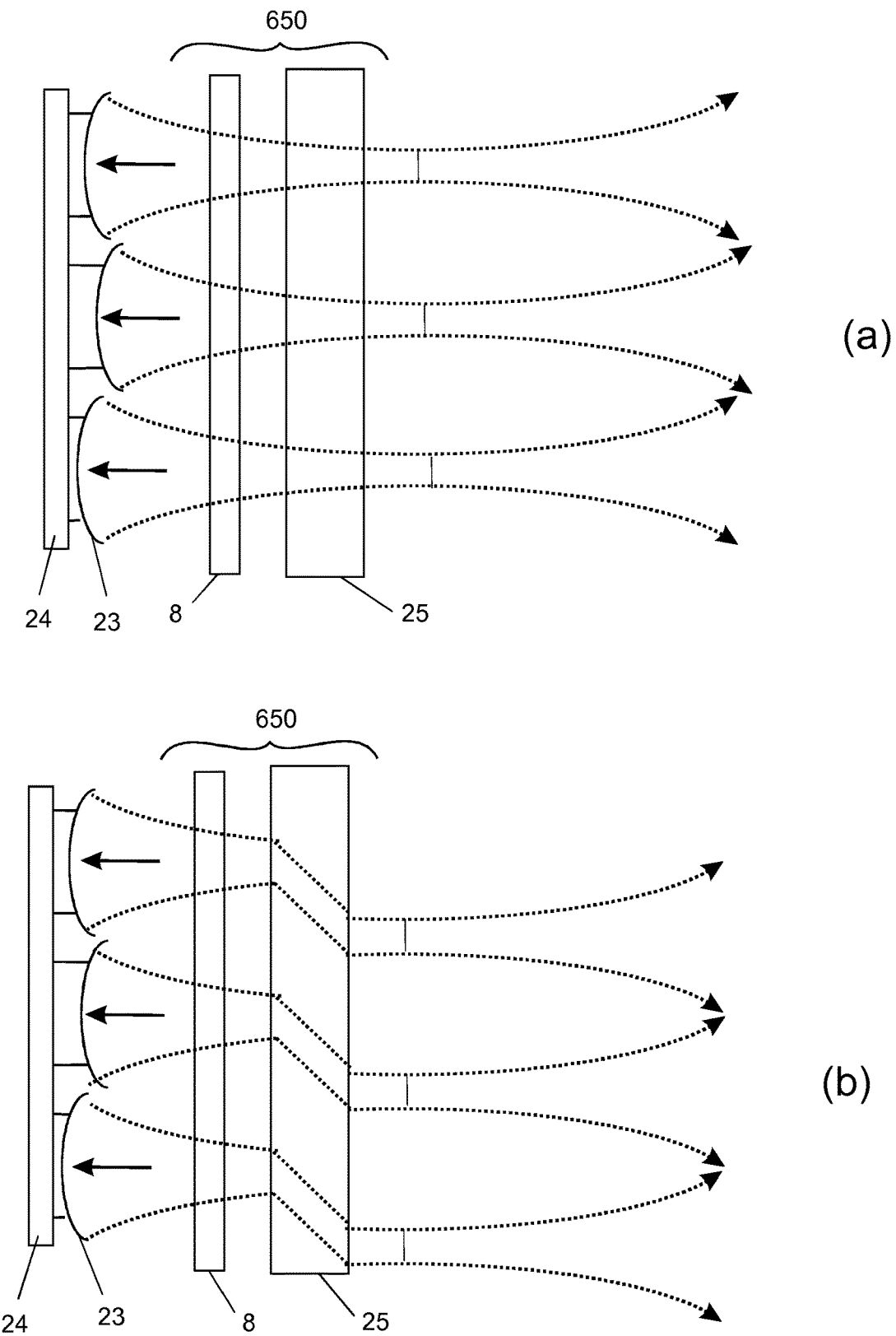
FIGS. 12(a) and 12(b): show a schematic representation of the spatial light modulator device according to FIG. 11 in conjunction with a beam offset device according to the invention.

FIG. 12 shows the same arrangement as FIG. 11, but here in combination with a beam offset device 650. The beam offset device 650 in this case as well comprises a switch device 8 and a birefringent optical element 25 of suitable thickness. The switch device 8, which is arranged before the birefringent optical element 25 in the light direction, comprises a polarization switch. Since a reflective arrangement, which may constitute an SLM, is shown in this exemplary embodiment, the polarization of the light which is emitted by an illumination device (not shown here) may for example be selected in such a way that on the forward path of the light onto the mirrors or micromirrors 23 the beam offset device 650 is passed through without an offset. This is shown in illustration (a), where the switch device 8 is in the off state.

The switch device 8 may in this case be controlled in such a way that, in the switched-on state, it rotates the polarization of the light by 90 degrees after a double pass, i.e. on the forward path and on the return path from and to the mirrors or micromirrors 23. This may, for example, be carried out by the switch device 8 being designed as a quarter-wave plate. In the switched-off state, the switch device 8 then leaves the polarization of the incident light unchanged. As can be seen in illustrations (a) and (b) of FIG. 12, the light reflected by the mirrors or micromirrors 23 passes through the birefringent optical element 25 with an offset or without an offset depending on the switching state of the switch device 8. According to illustration (b), the switch device is in an on state so that the polarization of the light striking the switch device 8 is rotated by 90 degrees. The light then subsequently striking the birefringent optical element 25 experiences an offset when passing through the birefringent optical element 25 so that the light emerges from the birefringent optical element 25 with a lateral offset with respect to the entry light.

Because of the focusing caused by the mirrors or micromirrors 23, such a combination of the two switching states, i.e. ON or OFF, acts like an SLM having two times the number of smaller pixels which do not overlap one another.

By means of the display devices shown in FIGS. 3, 6 to 10 and 12, according to the invention segments of the SLM can be generated in a viewing region, which segments, although they are superimposed, nevertheless have a lateral offset with respect to one another which is less than one pixel extent. Since the light paths of all generated segments of the SLM are at least approximately equal, all segments have the same aberrations, if there are any aberrations at all, which can then be corrected in a straightforward way.

The invention is not intended to be restricted to the exemplary embodiments shown here. In addition, combinations of the exemplary embodiments are possible. In addition, volume gratings, polarization gratings and birefringent optical elements may be combined with one another in the beam offset device, when expedient. In conclusion, it should more particularly be pointed out that the exemplary embodiments described above merely serve to describe the teaching claimed, but do not restrict it to the exemplary embodiments.

The invention claimed is:

1. A display device, in particular a head-mounted display or a head-up display, for representing a two-dimensional and/or three-dimensional scene, comprising a spatial light modulator device having pixels and a beam offset device, where
    the spatial light modulator device is illuminatable with light,
    the beam offset device is configured and controllable in such a way that the light modulated by the pixels of the spatial light modulator device is laterally displaceable by less than one pixel extent, and
    wherein the generation of segments of the spatial light modulator device in a lateral direction by the beam offset device is combined with the generation of segments of the spatial light modulator device in a lateral direction perpendicular thereto by a deflection device.

2. The display device as claimed in claim 1, wherein the beam offset device comprises at least one birefringent optical element or at least one volume grating and/or at least one polarization grating.

3. The display device as claimed in claim 2, wherein the lateral offset of the light is determined by the thickness of the at least one birefringent optical element.

4. The display device as claimed in claim 1, wherein the beam offset device comprises at least one birefringent optical element and a switch device, the birefringent optical element being coupled to the switch device and controllable in such a way that the incident light is laterally displaceable.

5. The display device as claimed in claim 4, wherein the switch device comprises at least one polarization switch.

6. The display device as claimed in claim 1, wherein the beam offset device comprises at least two volume gratings and/or at least two polarization gratings, the at least two volume gratings and/or the at least two polarization gratings being designed to be switchable.

7. The display device as claimed in claim 6, wherein the lateral offset of the light is adjustable by the selection of a selection of the distance between the at least two volume gratings or between the at least two polarization gratings.

8. The display device as claimed in claim 1, wherein the beam offset device comprises at least two volume gratings, which are spaced apart from one another, and a switch device, the at least two volume gratings being coupled to the switch device and controllable in such a way that the incident light is laterally displaceable.

9. The display device as claimed in claim 8, wherein the lateral offset of the light is adjustable by the selection of a distance between the at least two volume gratings.

10. The display device as claimed in claim 1, wherein the beam offset device comprises at least two polarization gratings, which are spaced apart from one another, and a switch device, the at least two polarization gratings being coupled to the switch device and controllable in such a way that the incident light is laterally displaceable.

11. The display device as claimed in claim 10, wherein the lateral offset of the light is adjustable by the selection of a distance between the at least two polarization gratings.

12. The display device as claimed in claim 1, wherein the beam offset device is provided to generate an offset of the light in at least one lateral direction.

13. The display device as claimed in claim 1, wherein an optical system for generating segments of the spatial light modulator device in an observer region is provided, the beam offset device being controllable in such a way that the individual segments are displaced with respect to one another by less than one pixel extent.

14. The display device as claimed in claim 13, wherein the optical system is provided for magnified imaging of the segments of the spatial light modulator device.

15. The display device as claimed in claim 13, wherein the optical system provides anamorphic imaging or broadening of the segments of the spatial light modulator device.

16. The display device as claimed in claim 1, wherein, for a generation of N segments of the spatial light modulator device in an observer region, a displacement of the individual segments with respect to one another by a value of 1/N of the pixel extent is provided, where N≠1.

17. The display device as claimed in claim 1, wherein the deflection device comprises at least one deflection element, in particular a liquid-crystal grating.

18. The display device as claimed in claim 1, wherein, for a primary color of the light, for a plurality of segments of the spatial light modulator device which are to be generated by the beam offset device, the color component of a scene or of a hologram can be written successively into the spatial light modulator device.

19. The display device as claimed in claim 18, wherein the deflection device is operable with a lower basic frequency than the spatial light modulator device.

20. The display device as claimed in claim 1, wherein the spatial light modulator device is operable sequentially for individual primary colors RGB for a segment of the spatial light modulator device.

21. The display device as claimed in claim 1, wherein, in the case of a lateral offset of the light of 1/N of the pixel extent, where N≠1, object points of a two-dimensional or three-dimensional scene are divided according to their position in an observer region into N subregions, which are assigned to N subscenes.

22. The display device as claimed in claim 1, wherein a beam combiner unit is provided, with which respectively at least two pixels of the spatial light modulator device are combinable to form a macropixel.

23. The display device as claimed in claim 1, wherein the spatial light modulator device is designed as a MEMS micromirror-based spatial light modulator device.

24. The display device as claimed in claim 23, wherein mirrors of the MEMS micromirror-based spatial light modulator device comprise a curved surface.

25. A method for representing a two- and/or three-dimensional scene having a high resolution, where a spatial light modulator device comprising pixels is illuminated with light, and a beam offset device is controlled in such a way that a lateral offset of the light modulated by the pixels of the spatial light modulator device by less than one pixel extent is carried out; and the lateral offset of the light is combined with a light offset in a direction perpendicular thereto by a deflection device.

26. The method as claimed in claim 25, wherein, by an optical system, segments of the spatial light modulator device are generated in an observer region, the beam offset device being controlled in such a way that the individual segments are merged while being displaced with respect to one another by less than one pixel extent.

27. The method as claimed in claim 26, wherein anamorphic imaging or broadening of the segments of the spatial light modulator device is carried out by the optical system.

* * * * *